United States Patent
Gilmore et al.

(10) Patent No.: US 7,621,810 B2
(45) Date of Patent: *Nov. 24, 2009

(54) SYSTEM AND METHOD FOR SELLING LOTTERY GAME TICKETS THROUGH A POINT OF SALE SYSTEM

(75) Inventors: Mark Gilmore, Johnston, RI (US); Vic Collucci, West Palm Beach, FL (US)

(73) Assignee: Scientific Games International, Inc., Alpharetta, GA (US)

( * ) Notice: Subject to any disclaimer, the term of this patent is extended or adjusted under 35 U.S.C. 154(b) by 457 days.

This patent is subject to a terminal disclaimer.

(21) Appl. No.: 11/093,754

(22) Filed: Mar. 29, 2005

(65) Prior Publication Data

US 2005/0233797 A1    Oct. 20, 2005

Related U.S. Application Data

(60) Provisional application No. 60/557,519, filed on Mar. 30, 2004.

(51) Int. Cl.
*A63F 9/24* (2006.01)
*G06F 17/00* (2006.01)

(52) U.S. Cl. .............................. 463/17; 463/42; 705/14; 705/21; 235/383; 222/23; 222/36; 221/1; 221/2

(58) Field of Classification Search ........................ None
See application file for complete search history.

(56) References Cited

U.S. PATENT DOCUMENTS

| | | | |
|---|---|---|---|
| 4,815,741 A | 3/1989 | Small | |
| 4,982,337 A * | 1/1991 | Burr et al. | 700/235 |
| 5,007,641 A | 4/1991 | Seidman | |
| 5,216,595 A | 6/1993 | Protheroe | |
| 5,239,165 A | 8/1993 | Novak | |
| 5,317,135 A * | 5/1994 | Finocchio | 463/17 |
| 5,451,052 A | 9/1995 | Behm et al. | |
| 5,475,205 A * | 12/1995 | Behm et al. | 235/375 |
| 5,560,610 A | 10/1996 | Behm et al. | |
| 5,580,311 A * | 12/1996 | Haste, III | 463/17 |
| 5,588,649 A | 12/1996 | Blumberg et al. | |
| 5,772,510 A * | 6/1998 | Roberts | 463/17 |
| 5,772,511 A | 6/1998 | Smeltzer | |
| 5,871,398 A | 2/1999 | Schneier et al. | |
| 5,897,625 A | 4/1999 | Gustin et al. | |
| 5,943,241 A * | 8/1999 | Nichols et al. | 700/232 |
| 5,949,042 A * | 9/1999 | Dietz et al. | 235/375 |
| 6,080,062 A * | 6/2000 | Olson | 463/42 |

(Continued)

FOREIGN PATENT DOCUMENTS

WO    WO 02/068072    9/2002

*Primary Examiner*—M. A Sager
(74) *Attorney, Agent, or Firm*—Dority & Manning, P.A.

(57) ABSTRACT

A system for selling game tickets for purchase by a game player within a store, the system comprising a point of sale terminal in communication with a game monitor that detects inputted game selection data and determine therefrom the number and type of game tickets to be played. The system further comprises a ticket dispensing system in communication with the game monitor. The game monitor detecting the activation of a predetermined terminal key of the point of sale terminal and dispenses the desired number and type of game tickets from the ticket dispensing system.

14 Claims, 14 Drawing Sheets

U.S. PATENT DOCUMENTS

| | | |
|---|---|---|
| 6,119,099 A | 9/2000 | Walker et al. |
| 6,168,521 B1 * | 1/2001 | Luciano et al. ............... 463/18 |
| 6,267,670 B1 | 7/2001 | Walker et al. |
| 6,351,688 B1 * | 2/2002 | Nichols et al. .............. 700/241 |
| 6,726,077 B2 * | 4/2004 | Roberts et al. .............. 225/103 |
| 6,899,621 B2 | 5/2005 | Behm et al. |
| 6,932,258 B1 * | 8/2005 | Roberts et al. .............. 225/103 |
| 2002/0100785 A1 * | 8/2002 | Roberts et al. ................. 225/2 |

* cited by examiner

SYSTEM AND METHOD FOR SELLING LOTTERY GAME TICKETS THROUGH A POINT OF SALE SYSTEM

CROSS-REFERENCE TO RELATED APPLICATIONS

This application claims priority to and the benefit of U.S. Provisional Application No. 60/557,519, filed Mar. 30, 2004, which is incorporated in its entirety in this document by reference.

FIELD OF THE INVENTION

The application relates in general to methods and systems adapted for use in selling lottery and wagering game tickets. More particularly, the present invention relates to a method and system for printing or dispensing lottery or wagering game tickets, or a combination thereof, through a retail point of sale system.

BACKGROUND OF THE INVENTION

Lottery games have become very popular, and have proven to be a successful means by which the public authorities sponsoring these games have been able to generate revenues for use in the public good. In a first type of lottery game known as a pre-printed or "instant win" lottery game, a lottery game player purchases individual game tickets of the type disclosed in U.S. Pat. Nos. 5,451,052, and 5,560,610, respectively, issued to Behm et al., for play. Each game ticket is pre-printed by an authorized lottery game ticket manufacturer, and typically offers a cash game prize of a predetermined amount, the prize amount being covered by a rub or scratch off coating printed or laminated onto the pre-printed surface of the lottery game ticket. Once the game player scratches off the coating, and if the prize amounts match as required by the rules of the game, the lottery game player will win the prize amount printed on the ticket.

A second type of popular lottery game is an on-line game, more commonly thought of as a "lotto" type game, which requires that a game player fill out a game play ticket with a series of lottery play numbers thereon, and/or designate a "quick pick" in which either a lottery terminal or an off-site lottery system computer generates the lottery play numbers. The lottery play slip is scanned into a lottery terminal, typically a stand-alone terminal found in a convenience store, whereupon a ticket is authorized by the lottery system and printed at the lottery terminal. The on-line games are the types of lottery game conducted on a weekly statewide basis by the several states, as are the regional lottery games such as the Power Ball and Big Game lotteries played in the United States. Similar national and regional games exist in foreign nations as well.

As well known to lottery authorities and lottery game players, both the pre-printed and on-line lottery games are typically purchased at a retail or convenience type of store provided with the requisite lottery terminal for on-line games, and a display case comprising either a series of bins or plastic holding racks for holding and displaying a supply of pre-printed game tickets. When a game player desires to play a pre-printed game, for example, the sales clerk is required to manually withdraw the requested number of tickets from the ticket storage bin, separate the tickets being sold from the remaining tickets in the ticket pack or book, and tender the tickets to the game player.

In the effort to promote the popularity of lottery games and thus improve lottery generated revenues, the respective lottery authorities have been looking for ways to expand at least the reach of the on-line lottery games beyond the single POS terminal retail or convenience stores into multi-lane retail operations provided with a POS terminal at each checkout lane, for example grocery stores and the like. One approach to this problem is disclosed in U.S. Pat. No. 5,216,595 to Protheroe. Protheroe teaches a system that combines the POS terminals of a store with an on-line lottery system by placing a lottery terminal at each of the selected POS terminals of the store, each of which is equipped with a bar code reader or scanning device. Each separate lottery terminal communicates with at least one in-store lottery controller, there being a plurality of such lottery controllers illustrated in the system of Protheroe. The lottery controllers communicate with a "back office" or off-site lottery system that authorizes and records the sale of all on-line lottery game tickets.

The system of Protheroe, however, is disadvantageous in that provides a relatively invasive and complicated system which positions a lottery terminal at, and requires the integration of the lottery terminal with, the store's POS terminals. Protheroe places a lottery terminal at each POS terminal due to the fact that the method employed by Protheroe includes the steps of first passing the scanned product codes from the POS terminal bar code scanner through the lottery terminal and then the POS terminal, or of first passing the scanned product codes through the POS terminal and then to the lottery terminal, before otherwise passing the scanned codes on to the in-store POS system controller. So constructed, the lottery system of Protheroe does not appear to provide a universal approach to readily adapting on-line lottery game ticket sales through existing multi-lane POS terminal operations without extensive modifications to the POS system, and fails to address the sale of pre-printed lottery game tickets entirely.

U.S. Pat. No. 5,239,165 to Novak discloses a bar code lottery ticket handling system that provides a free standing lottery "pick stand" separate and apart from the POS system, but which pick stand is otherwise networked to a separate lottery device provided at each POS terminal. The use of the pick stand requires the store's customers to stop shopping, go to the pick stand, select the numbers they wish to play or indicate that they wish to have a quick-pick series of play numbers generated for them, print a dummy lottery game ticket at the pick stand, and then take the dummy ticket to a POS terminal for being scanned into the POS system.

Once the dummy ticket is scanned into the POS system, the lottery device at the POS terminal will detect the appropriate lottery game code, and will then communicate with either the pick stand and/or an off-site lottery system to authorize the ticket, and then print the ticket at the POS terminal. The system of Novak, however, requires once again that a "lottery device" be positioned at each POS terminal, and that the lottery device be positioned between the bar code scanner and the POS terminal. So constructed, the system of Novak is invasive in that the lottery system must be integrated into each POS terminal as Novak requires a separate lottery device/terminal at each POS terminal, and an in-store pick stand networked with each of the lottery devices. Such a lottery game system may thus be somewhat costly to construct for the many types of POS systems that are available and in use, does not appear to be capable of being easily retrofit to existing multi-lane retail store operations, and does not address the sale of pre-printed lottery game tickets.

The patent to Blumberg et al., U.S. Pat. No. 5, 588,649, teaches a promotional gaming method for use as a part of a promotional game system in retail stores. In Blumberg et al. a game token is given to store patrons within the store, or provided as a part of a product package. A bar code reader at the POS terminal scans the token and a code is read therefrom. A promotional game program stored within the store's POS system then determines if the code from the token corresponds with a stored "winning" code number, and then randomly determines a prize to be awarded to the store customer. As such, Blumberg et al. teach an in-store merchandising tie-in and promotional system rather than any form of a lottery system.

U.S. Pat. No. 6,119,099 to Walker et al. discloses an "up-sell" lottery game that can be conducted through the POS terminals of a multi-lane store. The '099 patent employs a lottery program stored within the POS operating system of a store in which the program prompts a sales clerk at a POS terminal to ask a customer if they wish to play a lottery type game for the change they are due after having received the customer's payment for the products already purchased. The '099 patent envisions using the customer's change as an up-sell, with the up-sell lottery monies going into a common storewide lottery jackpot. The lottery program determines who among the store's customers will be a winner. As such, Walker et al. do not teach a state-wide on-line lottery system and gaming method.

The need still remains, therefore, for an efficient lottery gaming system and method adapted for ready use in retail stores, to include a multi-lane store such as a grocery store, for example. Currently, grocery stores are not among the most common distribution channels for lottery game tickets for the reasons that counter space is typically scarce, ticket dispensing and/or ticket printing will interrupt the regular flow of consumer traffic through the POS terminal, and the on-line systems described above represent a costly and complicated means of making only on-line lottery games available within a multi-lane retail store environment. Additionally, at least with regard to pre-printed lottery game ticket sales, the variety of available pre-printed tickets and the time needed to handle the tickets in a sales transaction will require an undue amount of the cashier's time, and also poses a much greater opportunity for cashier error in trying to dispense lottery game tickets and collect the sales price therefore in addition to scanning and collecting the price of the groceries and other items purchased by the store customer.

Accordingly, the need remains for an efficient on-line and pre-printed lottery game system and sales method which removes the barriers to selling in retail store environments, either a single lane or a multi-lane store, and yet which allows pre-printed lottery game tickets and other lottery products to be readily made available to consumers, and which will be minimally intrusive when used with existing POS systems. Additionally, there is a need for an on-line and pre-printed lottery game system and sales method which need not be integrated into the individual POS terminals of a store's POS system, which will not require undue amounts of store labor to safely and efficiently handle and dispense the lottery products, and which will also lower the cost of handling, stocking, and replenishing both on-line and pre-printed lottery supplies and tickets, respectively.

SUMMARY

The system and method of the present invention integrates the retail functions of modern retail point of sale systems, and all of the underlying infrastructure used therewith, for receiving player requests, and subsequently printing, dispensing, and selling lottery games or wagering games, for example horse or dog racing wagers, or any desired combination thereof, through the point of sale system of a retail store, whether a single cash register lane convenience store or a multiple cash register lane store.

The present invention provides an improved lottery or wagering system, all of which are hereinafter collectively referred to as a "lottery system," as well as methods for selling pre-printed lottery game tickets as well as on-line lottery game tickets or on-line wagers through at least one point of sale ("POS") terminal of a store. The invention also provides for the dispensing of items of monetary value, which may include either dispensing pre-printed items, or printing items of monetary value through at least one POS terminal of the POS system within a retail store.

Accordingly, in a first embodiment, the present invention comprises a system and method of selling and dispensing pre-printed lottery game tickets for purchase by a lottery game player within a store. In known fashion, the store will have a networked POS system with at least one pos terminal, and perhaps a plurality of POS terminals, located at a separate check-out or cash register lane of a store. Each POS terminal will have a bar code reader adapted to scan product identification codes thereat.

At least one pre-printed lottery game token or a lottery/wagering play slip, and preferably a plurality of lottery game tokens and play slips, will be provided within the store. Each pre-printed lottery game token will have at least one predetermined lottery game identification code printed thereon which is associated with a predetermined pre-printed lottery game. A game player traveling may thus pick up at least one lottery game token, if not a plurality of tokens, and take the token with them to the POS terminal where the token is presented to a sales clerk for being scanned thereat with the other items being purchased.

A game monitor passively listens to the in-store POS system and monitors the POS traffic between the pos terminal(s) and the back-office POS system controller. The game monitor will therefore detect a game identification code scanned in at the POS terminal. The game monitor will determine from the game identification code the type of pre-printed lottery game ticket to be played, and will communicate this information to a ticket dispenser assembly. The ticket dispenser assembly will send a dispense ticket command to a ticket dispenser located at the POS terminal such that the desired number and type of pre-printed lottery game tickets are dispensed therefrom. The functionality of the ticket dispenser assembly may be combined with the game monitor into a single device, for example a computer, and placed at the POS terminal location, and for each such POS terminal, as desired.

This gaming method also includes the steps of the game monitor determining the type of pre-printed lottery game ticket to be dispensed by looking up the scanned game data on a stored database of lottery games. Additionally, the ticket dispenser assembly identifies the ticket dispenser located at the POS terminal by looking up this information on a separate stored database of ticket dispensers located within the retail store. The POS terminal will look up the price of the lottery games being purchased and played on a price book or database stored within an in-store POS system controller and which contains the identification codes of the lottery games available in the store. The game monitor will detect the amount to be charged for the lottery tickets as it is signaled by the in-store POS system controller back through the POS system to the POS terminal, and will record, and then log, respectively the lottery game ticket sales transaction.

Both of the pre-printed and on-line lottery game (which includes wagering games) sales methods of this invention can be played by a lottery game player taking selected ones of the plurality of lottery game tokens, the tokens corresponding to the type and number of lottery games to be played, from within the store to the POS terminal, and presenting the selected lottery game tokens to the sales clerk for being scanned thereat. However, the lottery game player may also verbally instruct the sales clerk to change, for example increase, the desired number or type of lottery game tickets to be purchased, the sales clerk manually entering this information into the POS terminal. Moreover, the lottery game player may also verbally instruct the sales clerk that the player wishes to play a lottery or wagering game, identify the game to be played, how many tomes to be played, and the play indicia selected by the player, for example lottery numbers or the racetrack, race and race wager to be made, the sales clerk manually entering this information into the POS terminal as well.

In another embodiment, the invention provides a method and system of selling an on-line lottery game ticket to a lottery game player within a store, the store having a networked POS system with at least one POS terminal equipped with a bar code reader adapted to scan product identification codes, and thus lottery play slips, thereat. The lottery game player selects the game to be played and presents either at least one on-line lottery game token so that the bar code on the token may be scanned at a POS terminal of the system, or a lottery/wager play or bet slip to be scanned at the POS terminal, or verbally requests the game and game play indicia selected by the player and which is then keyed into the POS terminal.

The scanned or input game identification code is detected by a game monitor in communication with the POS terminal through the POS system once again, and depending on the game selected and how played through the POS terminal, a random series of lottery play numbers may be generated for game play if a quick pick game is played. If the player has filled out a lottery game play or bet slip, for racing, the player's selections are read by a separate document scanner interfaced with the system containing the game monitor interface. If desired, this functionality can be built into the POS terminal.

The game monitor will forward the selected lottery play numbers to a ticket dispensing system, the ticket dispensing system instructing a game ticket printer at the POS terminal to print at least one lottery game ticket bearing the selected lottery play numbers thereon. Of note, the functionality of the ticket dispensing system may be combined with the game monitor into a single device, for example a computer, as desired, or may be combined within and provided as a part of the printer.

The game monitor or other selected lottery system component may be in communication with an off-site host computer, for example a host lottery or race tote system computer. Any lottery transaction may be reported to the off-site host as desired or as otherwise required in known fashion for authorization and/or validation of the lottery ticket. Similarly, all racing or other wagering transactions will be reported by the game monitor or other selected lottery system components adapted to communicate the bet/wager made to an off-site wagering host computer, for example a tote computer.

It is to these objects, as well as the other objects, features, and advantages of the present invention, which will become apparent upon reading the specification when taken in conjunction with the accompanying drawings, to which the invention is directed.

DETAILED DESCRIPTIONS OF THE DRAWINGS

Figure 14A:
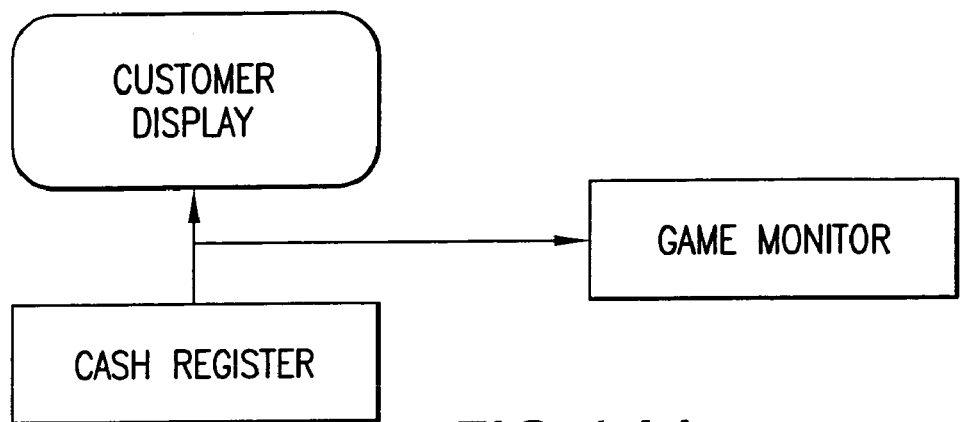
Figure 14B:
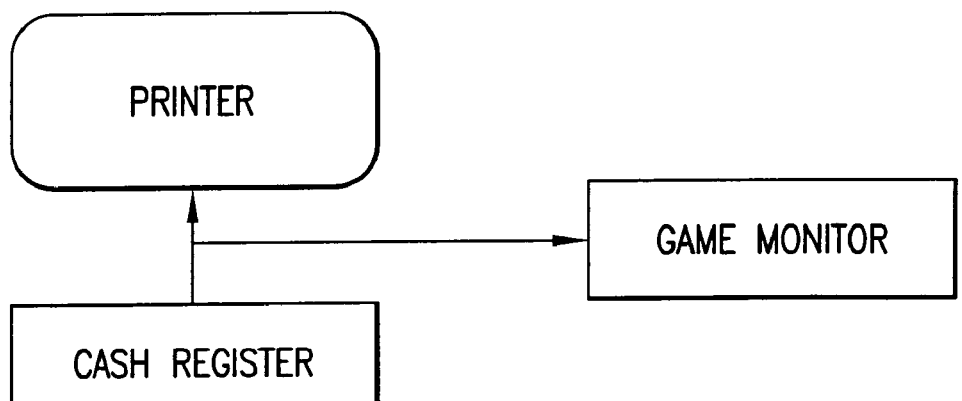
Figure 14C:
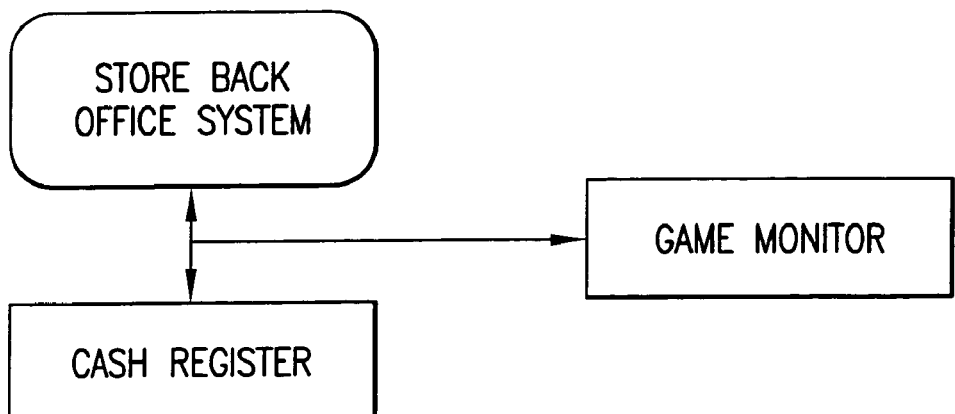

FIGS. 14A-C schematically illustrate alternate embodiments of the manner in which the POS traffic may be monitored as a part of the dispensing or printing systems hereof.

DETAILED DESCRIPTION OF THE INVENTION

Figure 1:
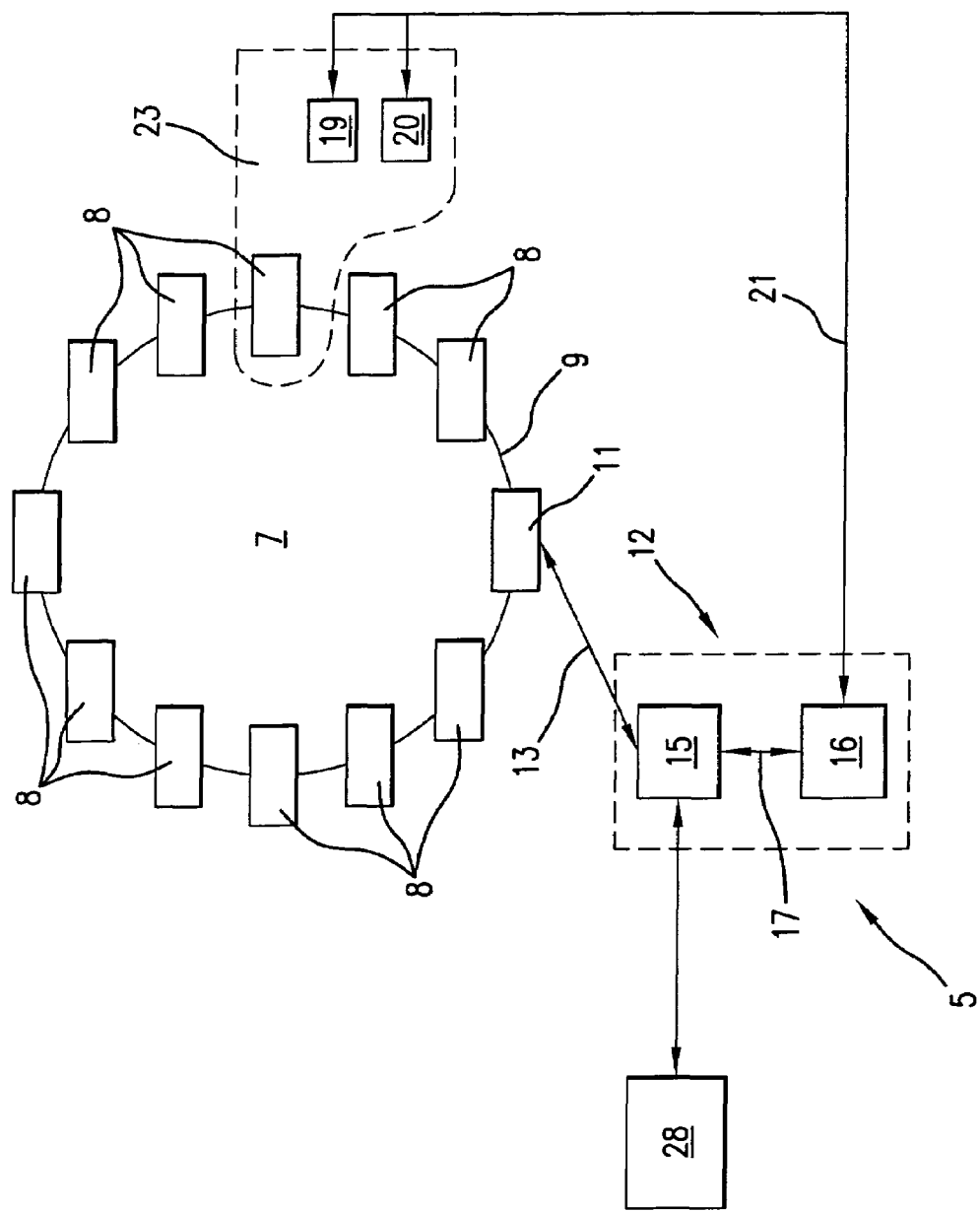
FIG. 1 is a block diagram of the system of the present invention adapted for use with the POS system of a retail store.

Referring now in detail to the drawings, in which like reference characters indicate like parts throughout the several views, FIG. 1 illustrates a lottery game system 5 adapted for selling and dispensing pre-printed lottery game tickets, or for selling and printing on-line lottery game tickets, or for dispensing pre-printed lottery game tickets and also printing on-line lottery game tickets, respectively. The lottery game system is shown in use with a conventional point of sale ("POS") system 7 having a plurality of POS terminals 8 networked to one another through a POS network 9 in a retail store environment.

The retail store may comprise any type of retail store operation, and may be provided for use with at least one POS terminal, for example one or two terminals within a "convenience" type of store, or with the POS terminals of a "multi-lane" store, for example a grocery store provided with a plurality of checkout lanes, each lane having a separate POS terminal thereat. The POS terminals are themselves be conventional, and may encompass those terminals manufactured by IBM, NCR, Dell, Fujitsu, or Datachecker, respectively, as well as any of the other several types of POS terminals that now exist or may be developed in the future. The POS terminals may be equipped with a bar code reader or scanner of known construction and operation if so desired, and may also be provided with a POS operating system or operating software provided by Palm, Oasis, Radiant, or Catalina Marketing among others.

As illustrated in FIG. 1, a plurality of POS terminals are provided, each of which is positioned at a separate check-out lane within the store. The POS network includes a POS system controller 11 of known type and construction, typically a computer provided with the requisite software and stored data, in communication with each of the POS terminals through the POS network. As known, the POS system controller is provided with a stored database or a "price book" containing the identification codes, which identification codes may be price look-up or "PLU" codes, of the items offered for sale in the store, as well as the prices of those respective items.

Rather than providing a lottery terminal at each POS terminal, the system of this invention provides a single lottery system controller 12, a computer, networked to the POS system controller through a network connection 13. The lottery system controller 12, and more particularly the game monitor, software, or module 15 thereof interfaces with the POS system controller in accordance with the type of store POS system in use. For example, if the POS system, and more particularly the POS system controller, uses the POS control system developed and marketed by Catalina Marketing Corporation, or its predecessor Catalina Electronic Clearing Services, for example, then the lottery system controller and the game monitor will interface with the POS controller through a Catalina Electronic Clearing Services interface, as known. The network connection 13 between the lottery system controller and the POS system controller may be any one of the known types of data communication networks, which may therefore include an Ethernet, RS 485, RS 232, token ring, USB, HDLC, and/or wireless network, among others. For stores not equipped with a Catalina system, the necessary information can be received from a cash register by monitoring its printer port, or alternately its customer display port, or its communications to a back office system, as illustrated in FIGS. 14A-C.

The lottery system controller, to include the game monitor 15 thereof, is connected to the store's POS system in much the same way that a POS terminal is networked to the POS system controller with the exception, however, that the lottery system controller is passive and only listens to the traffic on the POS network rather than transmitting data back to the POS system and/or the POS terminals during or at the completion of a lottery ticket sales transaction. Accordingly, during the lottery game ticket sales transaction the POS terminal at which the lottery game ticket sale takes place will read a lottery game identification code scanned into the bar code reader of the POS terminal from a pre-printed lottery game token, as described in greater detail below.

In response to the scanning of the lottery game identification code(s), the POS terminal will look up the price of the lottery game ticket(s) through a price book or a look-up database generated in association with the universal product codes ("UPC") corresponding to price look-up ("PLU") coded/identified games and which may be stored within the POS terminal, or in a separate PLU database or other data tables stored within the establishment's POS system controller, so that the customer will be charged the correct price for the game, lottery game, or lottery/wagering game tickets so purchased. As the game monitor is passively "listening" to all of the POS network traffic passing through the POS network or system, or all of the message traffic sent to a cash register's printer or customer display, the game monitor will detect the lottery game identification code as it is passed into the POS network, printer or customer display, as appropriate, by the POS terminal at which the token was scanned, and will then detect the sales price of, i.e., the amount to be charged for, the lottery games tickets being sold at the POS terminal as the pricing data therefore is communicated by the POS system controller back to the POS terminal, or as the price information is transmitted to the cash register's customer display or printer.

Still referring to FIG. 1, the lottery system controller includes the game monitor, as shown, as well as a separate ticket dispensing system 16, which, in one aspect, can comprise a ticket dispenser/printer controller, networked to the game monitor through a separate network 17, for example, an Ethernet network, although any known or otherwise suitable type of wired or wireless network may be used. Moreover, although a separate game monitor and ticket dispensing system are shown, the functionality of the ticket dispensing system can reside within the game monitor such that the game monitor and the ticket dispensing system comprise a single device, for example a computer, to include an NT workstation or any other suitable type of stand-alone computer, and adapted to implement the control processes of FIGS. 3-8.

The lottery game system includes a pre-printed ticket dispenser assembly 19, and/or a separate on-line lottery game ticket printer 20, each of which is stationed at respective ones of the POS terminals 8 comprising the store's POS system. The ticket dispenser assembly and ticket printer are each networked to the ticket dispenser system through a separate network connection 21, which may be any of the known types of networks and may include, for example, a wireless network allowing for the expeditious networking of the lottery game system with the store's POS system.

The POS terminal and its associated ticket dispenser assembly and ticket printer together comprises a POS station 23, manned by a sales clerk (not illustrated). The ticket dispenser assembly may comprise, for example and not by way of limitation, any known automated ticket or document dispenser assemblies, to include those manufactured by Scientific Games International, Inc. and its affiliated companies, and may thus include the dispenser mechanisms of U.S. Pat. Nos. 5,950,898, 6,609,644, and 6,669,071, as well as other types of dispensers equipped with a suitable controller interface adapted for communication with the lottery system controller 12, to include the game monitor 15 and/or the ticket dispensing system 16 thereof.

The lottery system controller will be adapted for communication with an off-site host lottery computer 28 (FIG. 1), as known, and accomplished through any of the known types of communication methods, networks, and devices, which may include dedicated network access or dial-up access, and that will allow the periodic or "live" instantaneous exchange of data between the lottery system controller and the lottery computer for at least the purposes of recording and authorizing on-line lottery game ticket sales prior to being printed by the ticket printer in much the same fashion as the lottery computer currently communicates with the known types of stand-alone lottery terminals used in convenience stores, for example.

Figure 2B:
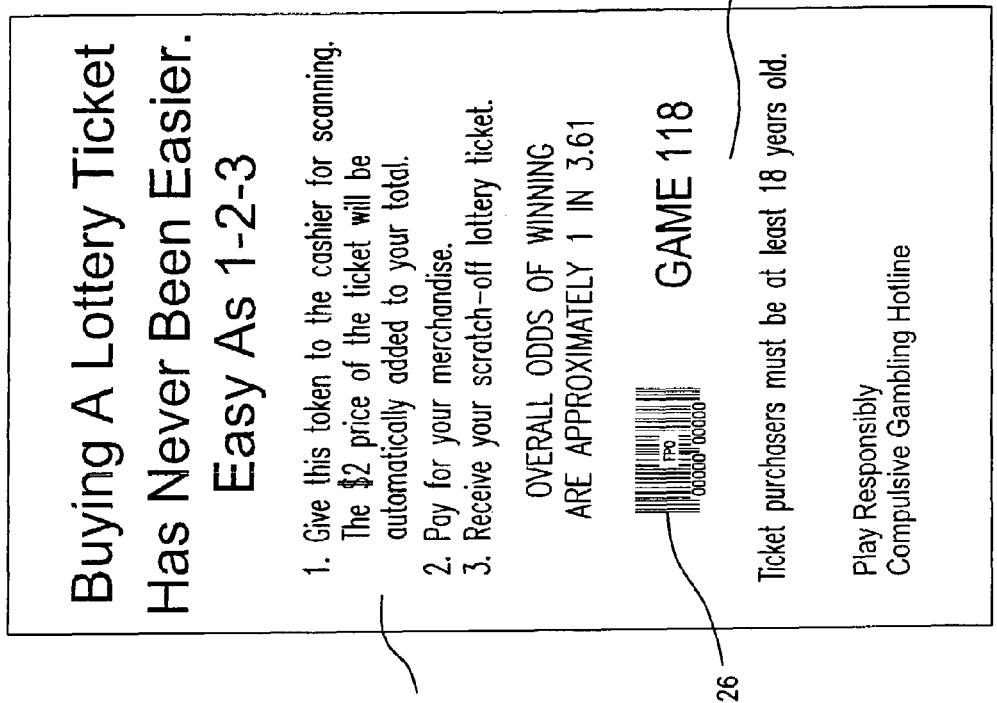
FIG. 2B is a rear view of the pre-printed lottery game token of FIG. 2A, also bearing the pre-printed lottery game identification code printed thereon.
Figure 2A:
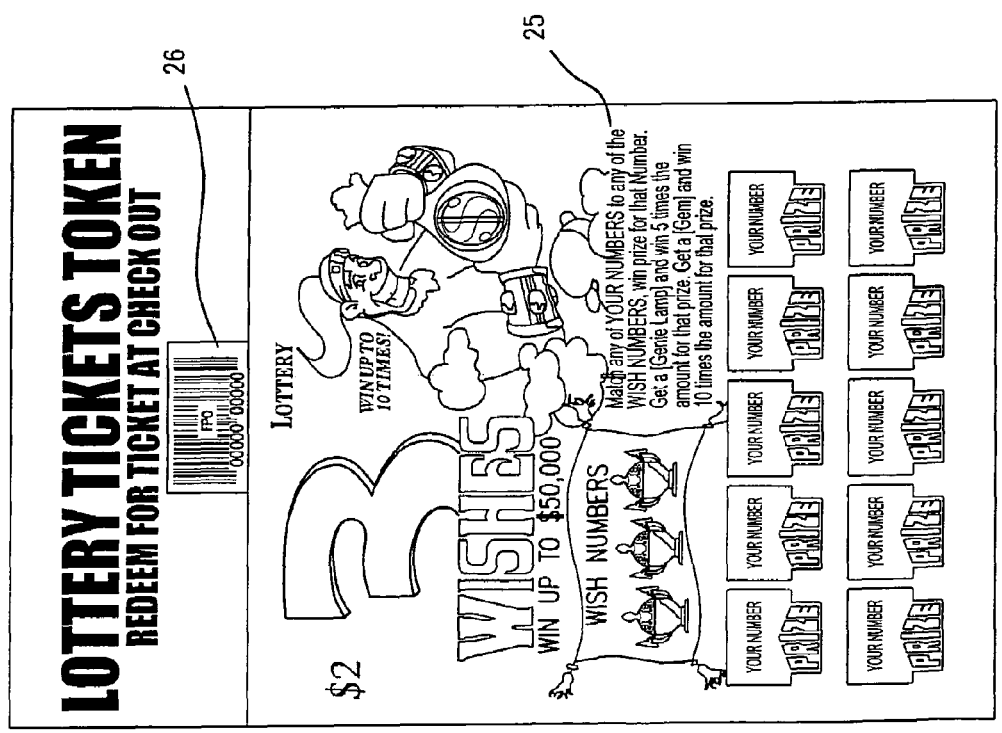
FIG. 2A is a front view of a pre-printed lottery game token, bearing a product game identification code printed thereon.

A pre-printed lottery game token 25 is illustrated in FIGS. 2A and 2B. The lottery game token includes a lottery game identification code 26 on either the front or rear, and/or both of the front and rear faces of the token, respectively, and as desired. Although the lottery game identification code is shown on both the front and the rear faces of the lottery game token in FIGS. 2A and 2B, all that is required is the lottery identification code appear in at least one location, on either the front or rear face of the lottery game token. The lottery game token shown in FIGS. 2A and 2B resembles a pre-printed or instant win type of lottery game ticket, and has on its rear face (FIG. 2B) a game identifier 27, here a game number, which will associate this token with a specific type of pre-printed lottery game.

Although not specifically illustrated, it is intended that a similarly configured pre-printed lottery game token will be provided for each type of pre-printed lottery game offered for sale at the store, each token having separate art and graphics thereon if so desired. A lottery game token of the type described above will also be made available for each type of on-line lottery game that may be offered for sale in the store. Accordingly, each lottery game token will have a separate game identification code printed thereon and specific to the type of game to be played, whether a pre-printed or on-line lottery game, with the token.

Although when the lottery game token 25 of FIG. 2A is printed to resemble an instant win game ticket, it does not contain the necessary laminated or scratch off layers such that it can be played as a game ticket. In all of the embodiments of this invention, the lottery game token is a pre-printed "dummy" token having no ability to serve as a valid lottery game ticket in any fashion. At least one type of lottery game token, one for each type of lottery game to be played thereby, and preferably a plurality of several differing types of lottery game tokens will be distributed in at least one and preferably a plurality of locations throughout the store so that the tokens can attract the eye of the consumer, and so that the store's customers may readily identify the type of lottery game they wish to play by the appearance or design of the token. So provided, the game tokens may be selected with great ease and speed, without requiring the shopper to otherwise stop and select game play numbers for an on-line lottery game, for example.

The lottery game identification code 26 on each lottery game ticket token distributed throughout the store will be for a unique, i.e., a specific and predetermined, type of lottery game, be it either a pre-printed lottery game or an on-line lottery game. Accordingly, there may not be a need for a separate ticket stand or pick stand at which a game player will enter their lottery game numbers for on-line lotteries if quick-pick games are played using the game selection tokens distributed throughout the retail establishment. In that instance, the game player will pick the token associated with the game they wish to play and take the token with them as they continue with their shopping with minimal interruption. If, however, the player wishes to choose their own numbers, there may be at least one, or any desired number of player selection stands or tables with play slips and markers available for player number selection.

Figure 3:
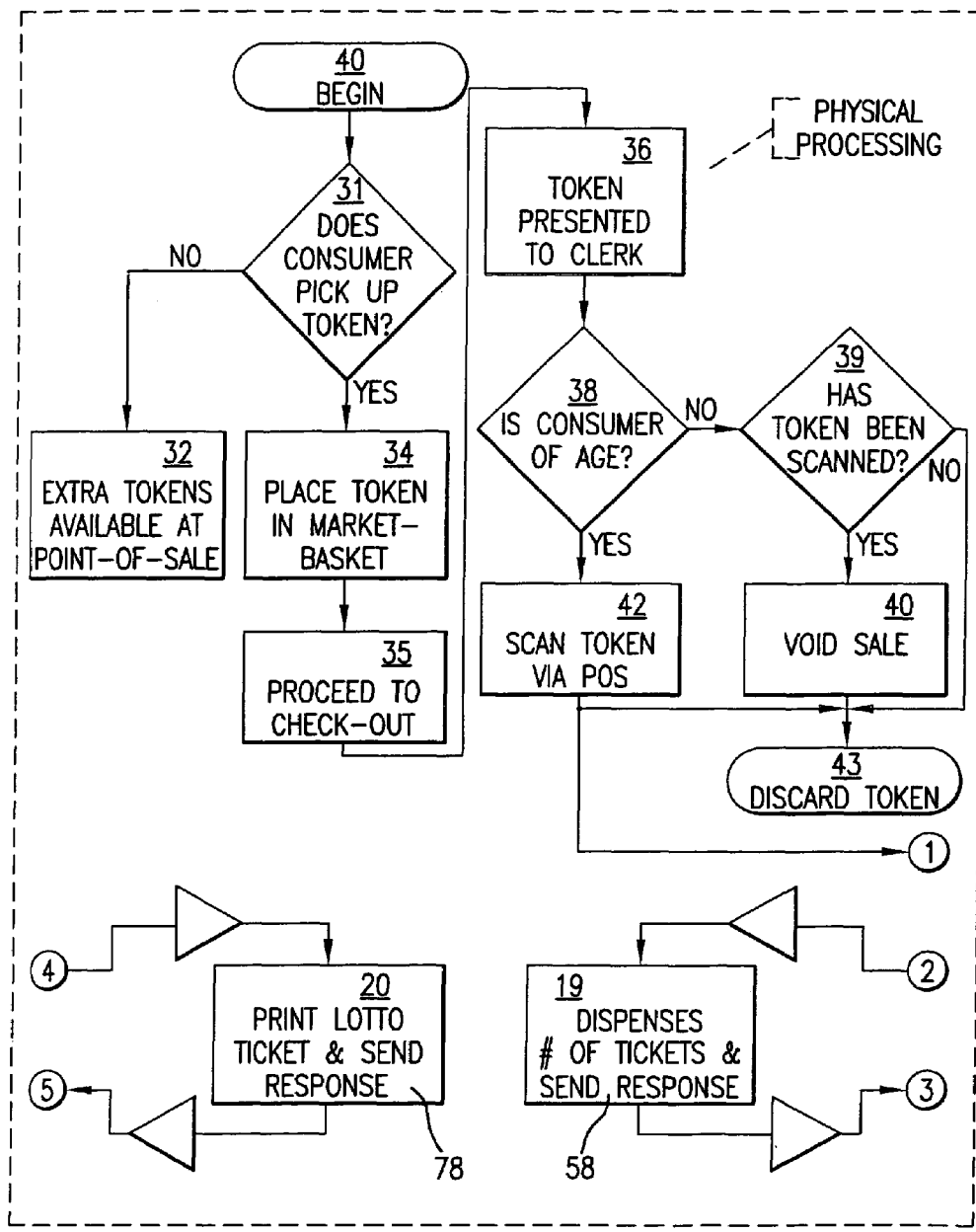
FIGS. 3-5 are process flowcharts of the method of dispensing pre-printed lottery game tickets and/or printing on-line lottery game tickets of the invention.

Referring now to FIGS. 3 through 6B, a method of selling and dispensing pre-printed lottery game tickets, or of selling and printing on-line lottery (as well as wagering) game tickets, or of selling both pre-printed and on-line lottery game tickets is illustrated. Referring first to FIG. 3, which schematically represents the physical actions that take place within the store, the process begins at step 30 with the consumer and potential lottery game player shopping within the store. As the game player shops, they may either pick up a token as indicated in step 31, or may select a token displayed and made available at the point of sale terminal as indicated in step 32 if using a token. If the game player has selected a token while shopping, that token is carried by the game player, for example by placing it in their shopping basket as shown in step 34, and the game player completes their shopping and ultimately proceeds in step 35 to check out at one of the store's POS terminals.

The lottery game player presents the lottery game token to a sales clerk at the POS terminal in step 36. Thereafter, as shown in decision block 38, the sales clerk will determine whether the consumer is of legal age to play the desired lottery game, and if not determines in step 39 if the token has been scanned. If the lottery game token has already been scanned and the lottery player is not of age, the sale is voided at step 40 and the token is discarded at step 43. If the token has not been scanned, then the process proceeds directly to step 43, where the lottery game token is discarded.

When the game player takes the lottery game token to the POS terminal, it is possible that the game player may want multiple numbers of the pre-printed lottery game ticket requested by the token, or may want to play an on-line lottery game a multiple number of times, respectively. In these instances, the lottery game player need only verbally instruct the sales clerk to increase either the number of pre-printed lottery game tickets to be dispensed, or the number of times they wish to play the on-line lottery game such that the appropriate number of on-line lottery play numbers are generated and printed on the appropriate ticket or tickets.

Additionally, a lottery or wagering game player may take a play or bet slip that the player has filled out with the desired play indicia, for example the lottery game to be played, the game numbers or other indicia to be played and how many timed played; or the wagering event, i.e., race, to be played which will include the racetrack or event venue, the type of wager to be made, and the wager indicia, for example which horse or horses to be played. It is understood that in addition to horse racing, wagering games include any type of sporting event on which bets may lawfully be placed, to include human sporting events. The play/bet slip with player selected data will be scanned at a scanning device which interfaces with the POS terminal or network, as desired, or with the POS terminal itself if configured to have a document scanning and/or optical character recognition function. Thereafter, the wager date is intercepted by the game monitor and the system is initiated to receive, place, and authorize the wager.

It is also anticipated that a game player may verbally request that a pre-printed lottery game ticket be dispensed or that an on-line lottery or wagering game be played and the requisite game ticket be printed at the POS terminal without having a game selection token or a play slip in hand. In this event, the POS terminal will be programmed to permit the sales clerk to manually request that a pre-printed lottery game ticket be dispensed, or that an on-line lottery game ticket be printed, respectively. This may be accomplished by having certain POS terminal keys, for example a price-look-up or "PLU" key, or other key combinations, programmed such that when the sales clerk punches a certain POS terminal key or key combination that a request for a lottery or wagering game ticket will be initiated by the POS terminal emitting the appropriate lottery game identification code which will then be sensed or detected by the lottery system controller/game monitor, and the appropriate lottery game ticket dispensing or printing procedure will be initiated.

Figure 4:
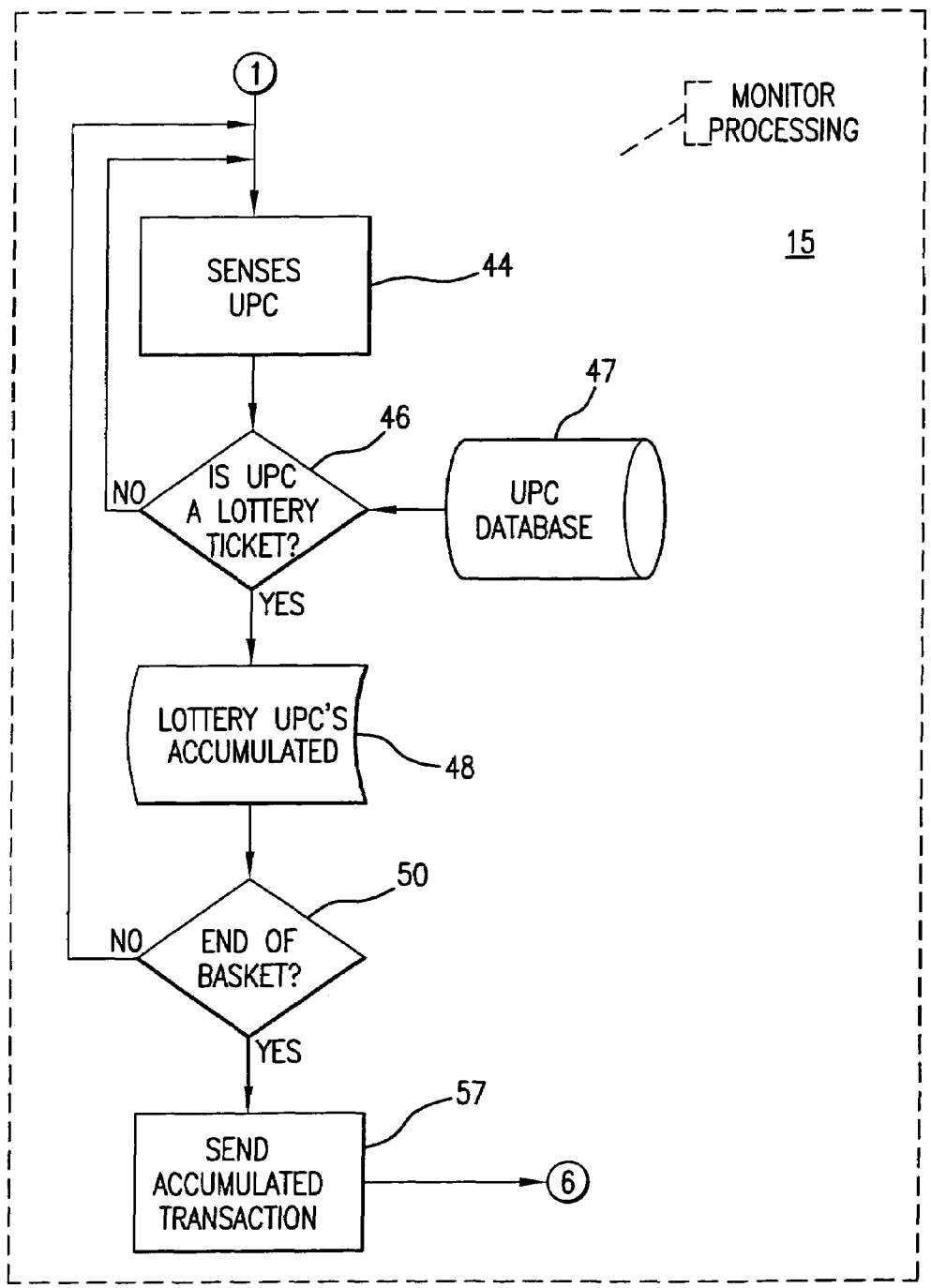

Still referring to FIG. 3, if the consumer is of age in step 38 and the token has not yet been scanned, the token will be scanned in step 42 by passing it over at least one bar code reader, of any known type thereof, provided as a part of the POS terminal. Once scanned, the data passes through the POS terminal 8 into the POS network 9 (FIG. 1), and from there into the POS system controller 11. Referring now to FIG. 4, which represents those actions taking place within the game monitor 15 (FIG. 1), the game monitor, through its network or register connection 13, as desired, with the POS system controller, is passively monitoring or "listening in" at step 44 on all of the network traffic passing through the POS system. The game monitor reads or detects all of the scanned product and/or lottery game identification codes entered into the POS network through the scanners of the respective system POS terminals.

As known the product identification codes for the items offered for sale within the store may comprise a universal product identification code ("UPC"), as may be, and preferably are, the lottery game identification codes. If a sensed UPC belongs to a lottery game as determined in step 46, the game monitor will compare the game identification code to a game identification code database in step 47 for determining the type of lottery game to be played. The POS terminal obtains the sales cost of the lottery game tickets being purchased from the store's "price book" stored within the POS system controller, which sales cost is detected by the game monitor as this information is passed by the POS system controller back to the POS terminal through the POS network, the game monitor recording this in step 60, and logging the transaction in step 62, as described below.

Figure 9:
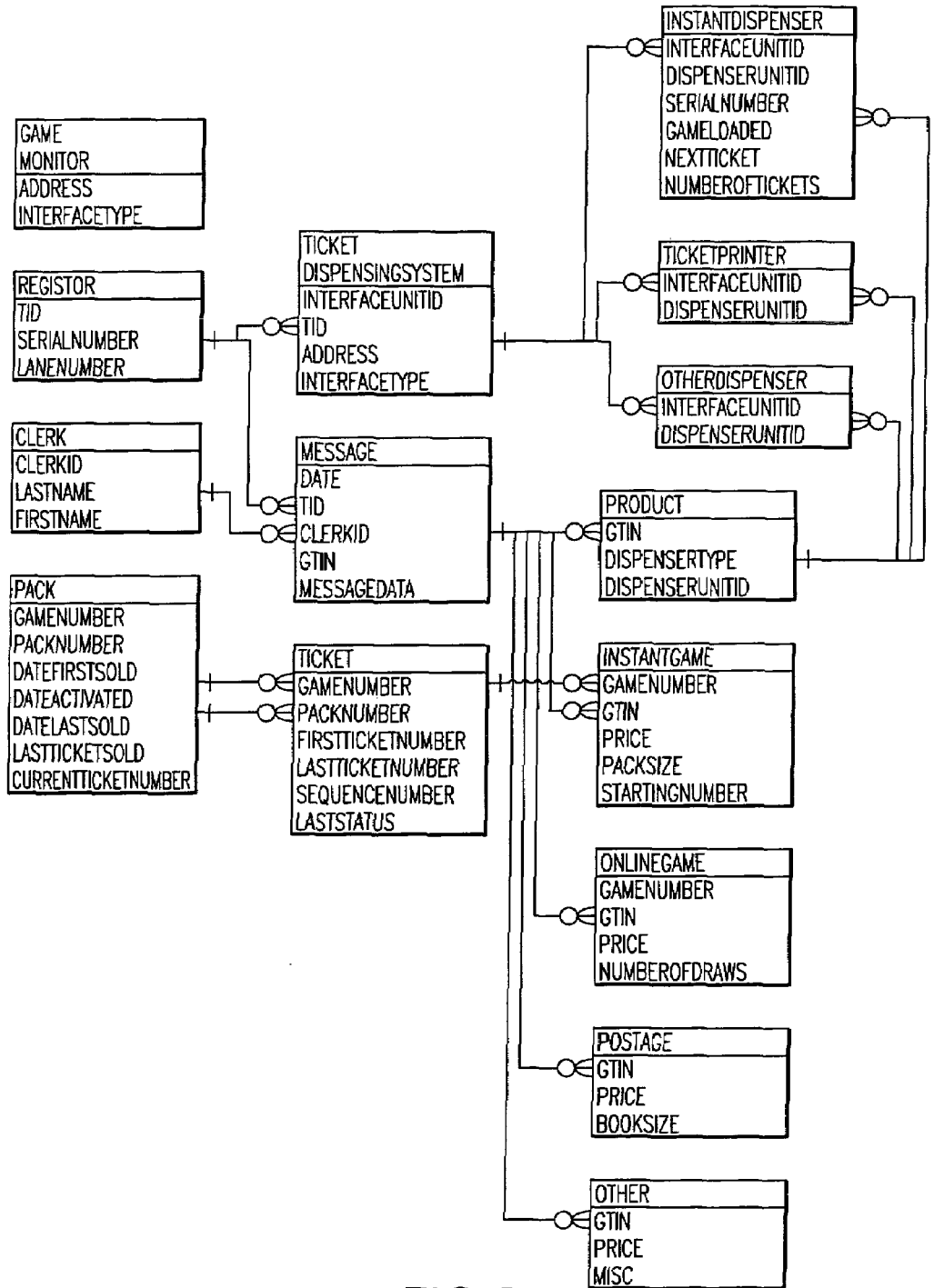
FIG. 9 is a schematic illustration of the look-up table or database stored within the lottery system controller of the invention.

FIG. 9 schematically illustrates a look up table or database stored within the game monitor/lottery system controller, and illustrates those pre-programmed criteria being determined through the lottery game system and the scanned lottery game identification code or codes. This will include the location and identity of the POS terminal at which the game identification code has been scanned, the identity of the sales clerk thereat, and will identify the type of pre-printed and/or on-line lottery game to be played. If a pre-printed lottery game is to be played, the game monitor and/or the ticket controller identifies the ticket dispenser assembly 19 (FIG. 1) at the POS terminal, and will poll the ticket dispenser assembly to determine if the desired number and type of pre-printed lottery game tickets are available to be dispensed and sold therefrom.

Referring to FIG. 4, if the UPC that has been scanned and sensed in step 44 is not a lottery ticket, then the process loops back on itself to step 44 until such time as it detects a lottery game identification code, whereupon the game monitor will look up in step 47 the type of lottery game to be played from the above-described lottery game database. Assuming that a lottery game is to be played and has been properly identified through the look-up table/database, the game monitor accumulates all of the lottery game identification codes, and once the end of the shopping basket is reached, i.e., the items being scanned at the POS terminal have been completed and a subtotal has been requested, the game monitor will send the accumulated game identification codes to the ticket dispensing system, as reflected in FIG. 5. As discussed hereinabove, it is anticipated that the process steps implemented by the ticket dispensing system 16 may instead be undertaken by the game monitor performing the functions of both the game monitor and ticket dispensing system.

Figure 5:
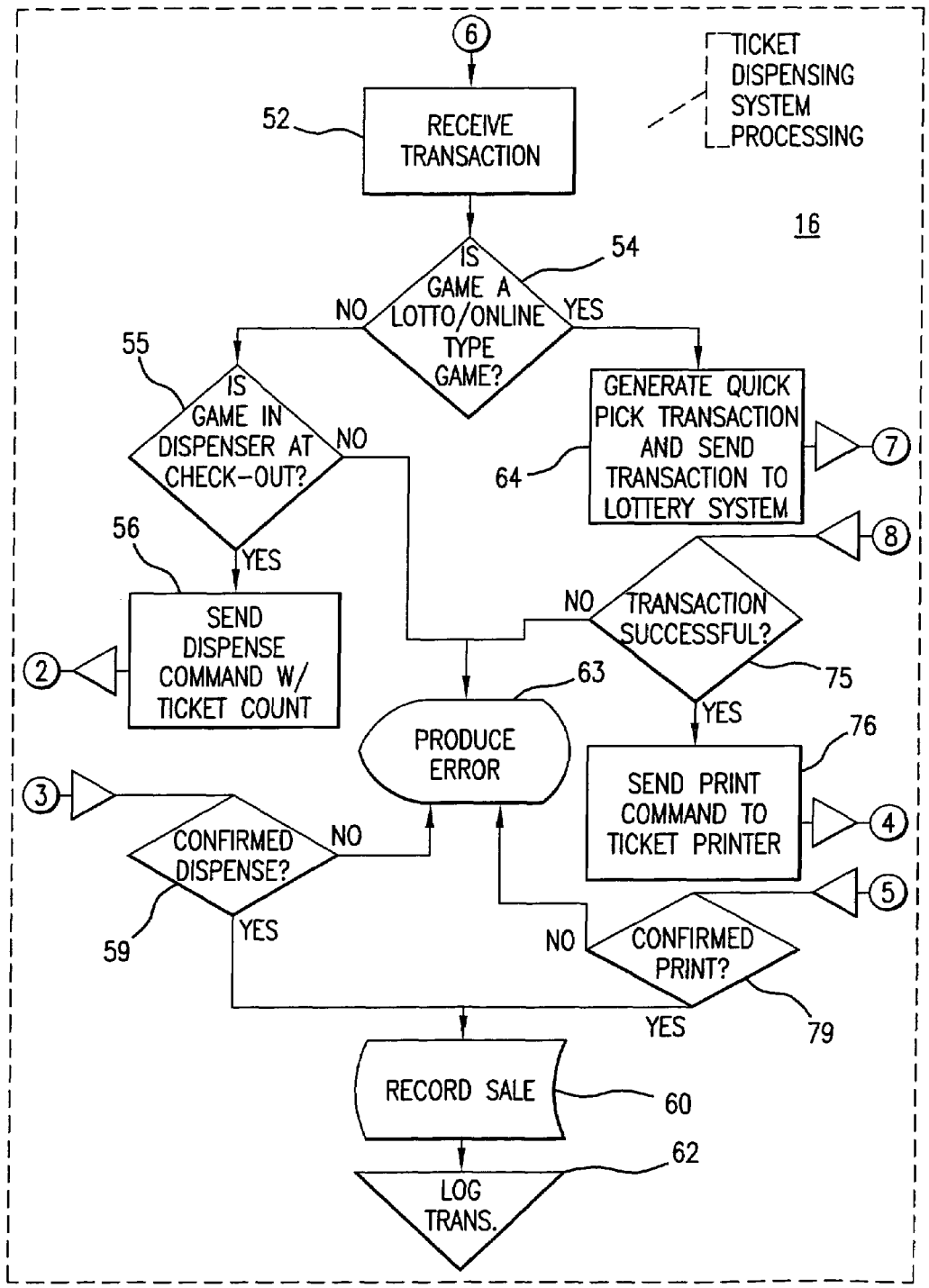

Referring now to FIG. 5, the accumulated game identification codes have been forwarded to and received by the ticket dispensing system 16 (FIG. 1) in step 52. The ticket dispensing system determines if the lottery game or games being played are an on-line or a pre-printed lottery game. If the game identification code is for a pre-printed lottery game, then the process moves to step 55 whereupon the ticket dispensing system will poll the identified ticket dispenser assembly at the POS terminal to determine if the desired lottery game ticket is in stock. If so, the process will proceed to step 56, whereupon a dispense ticket command will be sent to the ticket dispenser assembly, as illustrated in FIG. 3. Once the dispense ticket command has been given, and the desired number and type of pre-printed lottery tickets have been dispensed, the dispensing of the tickets is confirmed in step 59. Once confirmed, the process proceeds to step 60 to record the sale within the game monitor, in which the sales cost of the lottery game tickets detected by the game monitor as this data is transmitted by the POS system controller back to the POS terminal is recorded, and the game monitor then logs the transaction in step 62. If, at step 55, the ticket controller determined that the desired number and/or type of pre-printed lottery game tickets were not available in the ticket dispenser, an error message will be produced in step 63, and the lottery transaction will be concluded.

Figure 6B:
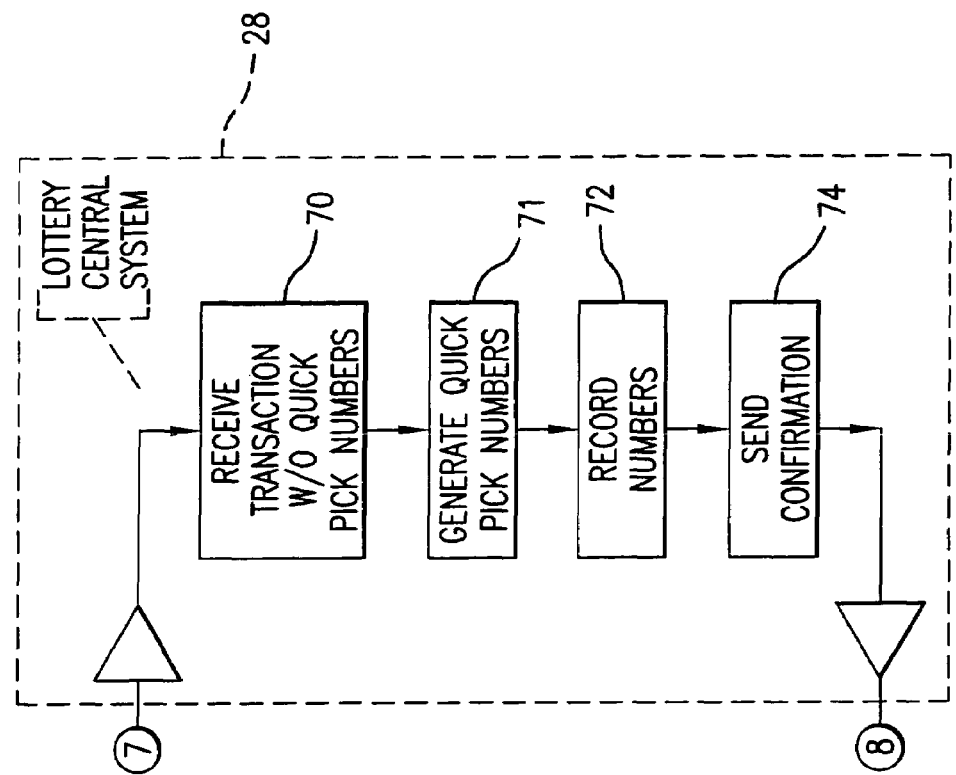
FIG. 6B is a flowchart of a second alternate subroutine that may be practiced by the process of this invention.
Figure 6A:
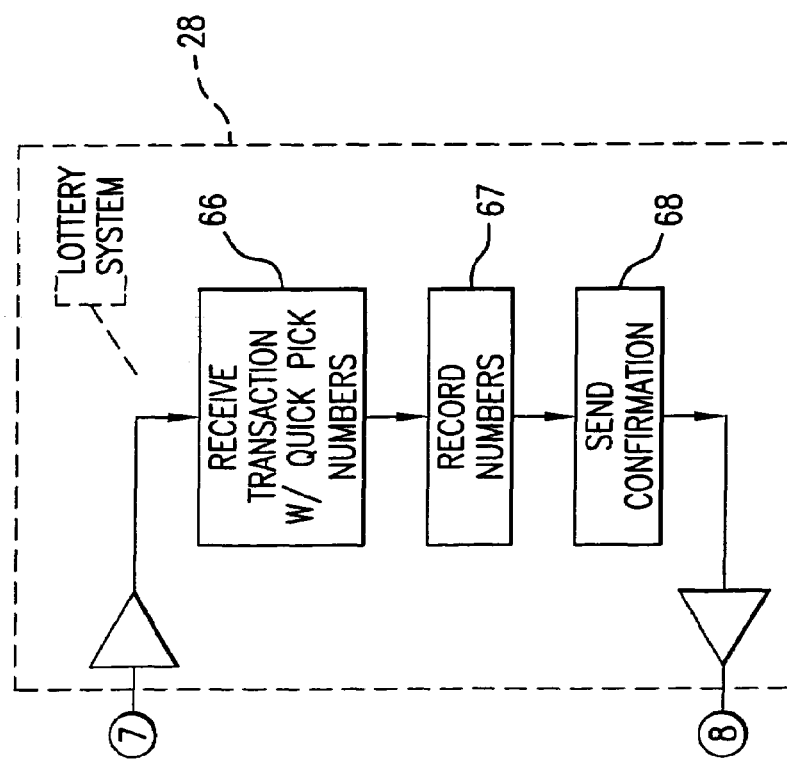
FIG. 6A is a flowchart of a first subroutine than may be practiced by the process of this invention.

Returning now again to step 54, where using a token for an on-line lottery game, the process proceeds to step 64 which generates a quick-pick transaction and sends the transaction data or request to the off-site lottery computer 28 (FIG. 1) performing one of the two separate subroutines illustrated in FIGS. 6A and 6B. The type of on-line lottery game described for use with the tokens of the system is a "quick-pick" game in which the lottery system or off-site host computer generates a series of random lottery game play numbers for the game player, and then forwards the lottery play numbers to the ticket printer located at the POS terminal.

The use of the quick-pick ticket is well known to those of skill in the art, and to lottery game players, and the manner in which the quick-pick numbers are generated is a detail of the particular lottery system in use. Certain lottery systems generate the quick-pick numbers at the lottery terminal and forward these numbers to an off-site lottery computer, whereas other types of lottery systems forward the quick-pick request from a lottery terminal to the lottery computer that generates the quick-pick numbers.

Where the game player verbally instructs the sales clerk of the desire to play an on-line lottery game, the sales clerk presses the appropriate keys on the POS terminal programmed for the game(s) being played, the signal is detected by the game monitor as described herein for token originated games, and the transactional data forwarded by the in-store lottery system described herein to the off-site host computer. The lottery system host computer receives the game request and game play data, whereupon the lottery game ticket is authorized and the authorization returned to the in-store lottery system. On receipt of the game ticket authorization, the in-store lottery system instructs the ticket printer located at the originating POS terminal to print the on-line lottery game ticket(s) for the game player. The same process, differing only by communication with an off-site gaming host computer, for example a tote system computer, occurs where an on-line wagering game is being played, for example where a bet is made verbally by the game player to the sales clerk.

Referring now to FIG. 6A, therefore, where the game monitor has generated the random numbers for the lottery quick pick(s) in step 64, using a random number generation program stored within and executed by the computer comprising the game monitor, the quick-pick number transaction is received by the lottery computer in step 66. Thereafter, the lottery computer will record the quick-pick numbers in step 67, and send a confirmation thereof back to the in-store lottery system in step 68 so that the desired on-line lottery game ticket(s) can be printed in step 75 (FIG. 5).

If, in the alternative, the lottery computer generates the random game play numbers, then the subroutine illustrated in FIG. 6B is followed. Accordingly, in step 64 the game monitor will generate a quick-pick request to the off-site lottery computer, which request is received in step 70. Thereafter, the lottery computer generates the quick-pick numbers in step 71, records these numbers in step 72, and then sends a confirmation/authorization thereof in step 74 back to the in-store lottery system which will permit the on-line lottery game ticket or tickets to be printed.

Referring now to FIG. 5, once the on-line lottery ticket quick-pick number generation sequence has been completed, a determination of whether a quick-pick number has been successfully generated is performed in step 75. If not, then an error message is produced in step 63 and the lottery transaction is concluded. If, however, the quick-pick number transaction has been successful, a print ticket command is sent by the ticket dispensing system in step 76 to the ticket printer 20 (FIG. 3), such that in step 78 the desired number of on-line lottery game tickets are printed. Thereafter the process will determine in step 79 if the lottery game ticket has been printed, and if so the process proceeds to step 60 where the game monitor records the sale of the lottery game tickets, the sales price of the lottery game tickets being detected by the game monitor as this information is transmitted by the POS system controller back to the POS terminal, and the game monitor logs the transaction in step 62. At the conclusion of the lottery game ticket sales transaction, the POS terminal at which the lottery transaction has been conducted will print on the customer's receipt the number and type of lottery game tickets that have been sold to the consumer.

It is anticipated that the logged sales transactions in step 62 (FIG. 5) will be periodically forwarded to the off-site lottery computer 28. This may occur by the game monitor dialing up or accessing the lottery computer at pre-determined time intervals, or may involve the lottery computer polling the game monitor at pre-determined time intervals. Additionally, and if so desired, the network connection between the game monitor and the lottery computer can be a continuous or "live" two-way feed to and from the lottery computer by the game monitor.

The advantages of the system, therefore, especially with regard to the sale of pre-printed lottery game tickets, is that the system for the first time allows lottery authorities to monitor the sale of pre-printed lottery game tickets on a real-time basis. By so doing, lottery game officials will be able to determine the type and volume of pre-printed lottery game tickets being sold, which will allow the lottery authorities to order replenishment supplies of the lottery game tickets for the store on a "just in time" basis thus reducing the labor time required by store personnel to otherwise do this. In addition, by using an automated pre-printed ticket dispenser, security of the lottery system has been increased in that no longer are pre-printed lottery tickets available in loose rolls or packs which are susceptible to theft, the ticket dispenser dispensing only the requested number of tickets as a result of a specific and requested lottery pre-printed ticket sale transaction.

An additional feature of the system of this invention when used for the sale of pre-printed lottery game tickets, but which can also be used with on-line lottery ticket sales, deals with the preparation of "shift" reports for the pre-printed lottery game tickets sold during a cashier's work shift. Under current practice, at the beginning of their work shift a sales clerk will record the ticket serial number of the first or top most pre-printed game ticket available for sale in each bin of pre-printed lottery game tickets offered for sale, which bins are typically unsecured acrylic dispensers. At the end of the shift, the sales clerk will record the then current ticket serial number of the top most lottery game ticket in each bin, and then reconcile the number of lottery game tickets sold or voided during the work shift. A problem with this practice is that one or more of the tickets can be easily removed or stolen from the acrylic dispensers, or if the ticket pack was exhausted and a new ticket pack placed into the dispenser without recording the number of the last lottery game ticket of the first ticket pack and the succeeding first pre-printed lottery game ticket of the next ticket pack opened and sold during the rush of sales activity, it becomes difficult, if not at times impossible, to properly reconcile pre-printed lottery ticket sales. Moreover, in a multi-lane store, for example a grocery store, this type of labor will not be made available for the selling of pre-printed lottery game tickets as ticket sales will likely be a relatively small proportion of overall sales in the store, and thus of relatively minor importance to the store personnel and management.

By using the system and method described hereinabove, a much simpler reconciliation process results. The game monitor will process the sales of all pre-printed lottery game tickets, as described above. Tickets will only be dispensed from a secured and automated pre-printed ticket dispenser assembly, when and if purchased. Accordingly, the game monitor will have a record of every lottery ticket sale that has occurred, and is thus able to provide the POS system controller with the necessary information for preparing a complete lottery shift report for the POS terminal. The shift report will include the identification of the sales clerk, the sales amount and number of lottery game tickets sold, and the time of each ticket sale if so desired. The sales clerk will print a shift report from the POS system, just as the sale clerk currently prints their shift reports now, and will also request that a shift report be printed from the lottery system controller, a printer being made available for this purpose and in communication therewith, which printer may be the POS terminal receipt printer. Thereafter, the two shift reports can be compared, and any discrepancies between the number of tickets sold and the amounts collected therefore can be readily identified.

The lottery gaming method of FIGS. 3 through 6B thus allows for the automated sale of pre-printed lottery game tickets in a retail store environment in heretofore unknown fashion. Additionally, this invention provides a simplified lottery system and lottery gaming method for selling on-line lottery game tickets through a multi-lane store environment. The described lottery game system is simple in its construction, having only a single lottery system controller which passively monitors or listens in on the network traffic between the POS terminals and the POS system controller through the POS network, and a lottery terminal or device is not required to be positioned at, and/or associated with the bar code scanner of, each POS terminal.

Another feature of this invention, therefore, is that this system may be rapidly and readily retrofit to existing POS systems in multi-lane store environments. The lottery system controller 12 is networked to the POS system controller 11 with a simple, single network connection. The lottery system controller is then networked to each lottery ticket dispenser and/or ticket printer, which preferably can be done by using a wireless network such that hard wiring of the system components need not occur, and which allows the system to be quickly installed within existing multi-lane store environments.

If desired, the lottery game system of FIG. 1 can be adapted to authorize pre-printed lottery game tickets as they are being dispensed, in effect turning a pre-printed or instant-win lottery game into an on-line lottery game for improved security purposes. Accordingly, and if desired, a bar code reader or scanner will be provided as a part of the pre-printed lottery game ticket dispenser assembly. Each pre-printed lottery game ticket bears an encrypted validation number thereon, encoded into a I 2 of 5 bar-code printed on the back of the ticket, which validation number uniquely identifies the game ticket. When and as a pre-printed lottery game ticket is dispensed from the ticket dispenser assembly, therefore, the bar coded ticket validation number is scanned by the ticket dispenser bar code reader and forwarded by the ticket dispenser assembly through its network connection to the ticket dispensing system. The ticket dispensing system forwards the ticket validation number to the game monitor, which in turn forwards the validation number to the off-site lottery computer in the form of a new "Ticket Activation Message".

The lottery computer records the ticket validation number and authorizes the ticket so that the game ticket is now "live," and in play. Each ticket is therefore activated and validated only as It is dispensed from the ticket dispenser. In this manner, only those pre-printed lottery game tickets properly dispensed, i.e., scanned into the lottery system, will be valid and entitled to be cashed if a winning ticket. Any pre-printed tickets that may have been stolen, for example, will not have been scanned into the lottery system, no record of the ticket sales will exist in the lottery computer, and the tickets will not be authorized for payment if the ticket holder attempts to cash the tickets through a lottery retailer as the stolen tickets are inactive, and thus worthless.

Figure 7:
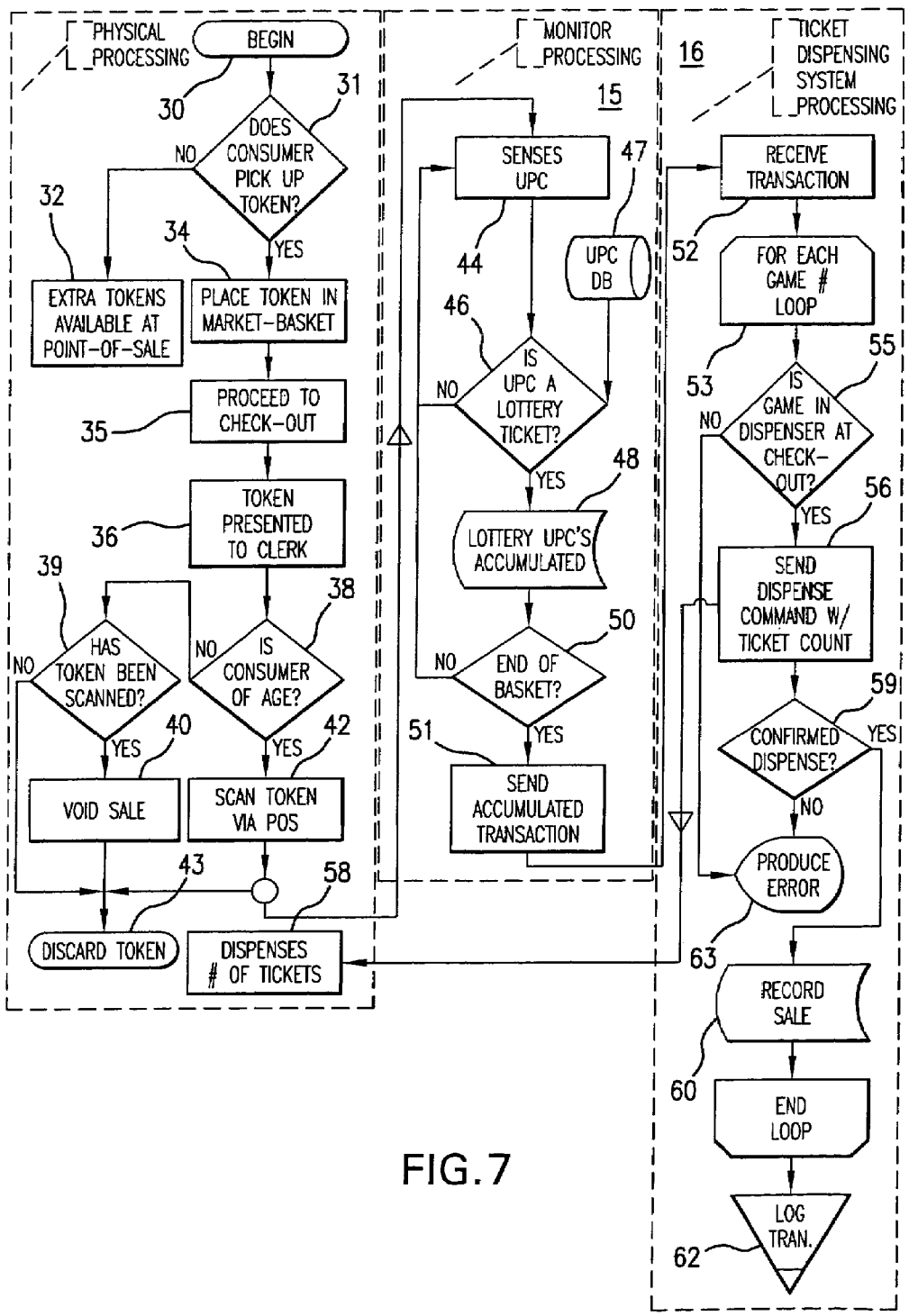
FIG. 7 is a flowchart of a method of selling and dispensing pre-printed lottery game tickets, only, of the invention.
Figure 8:
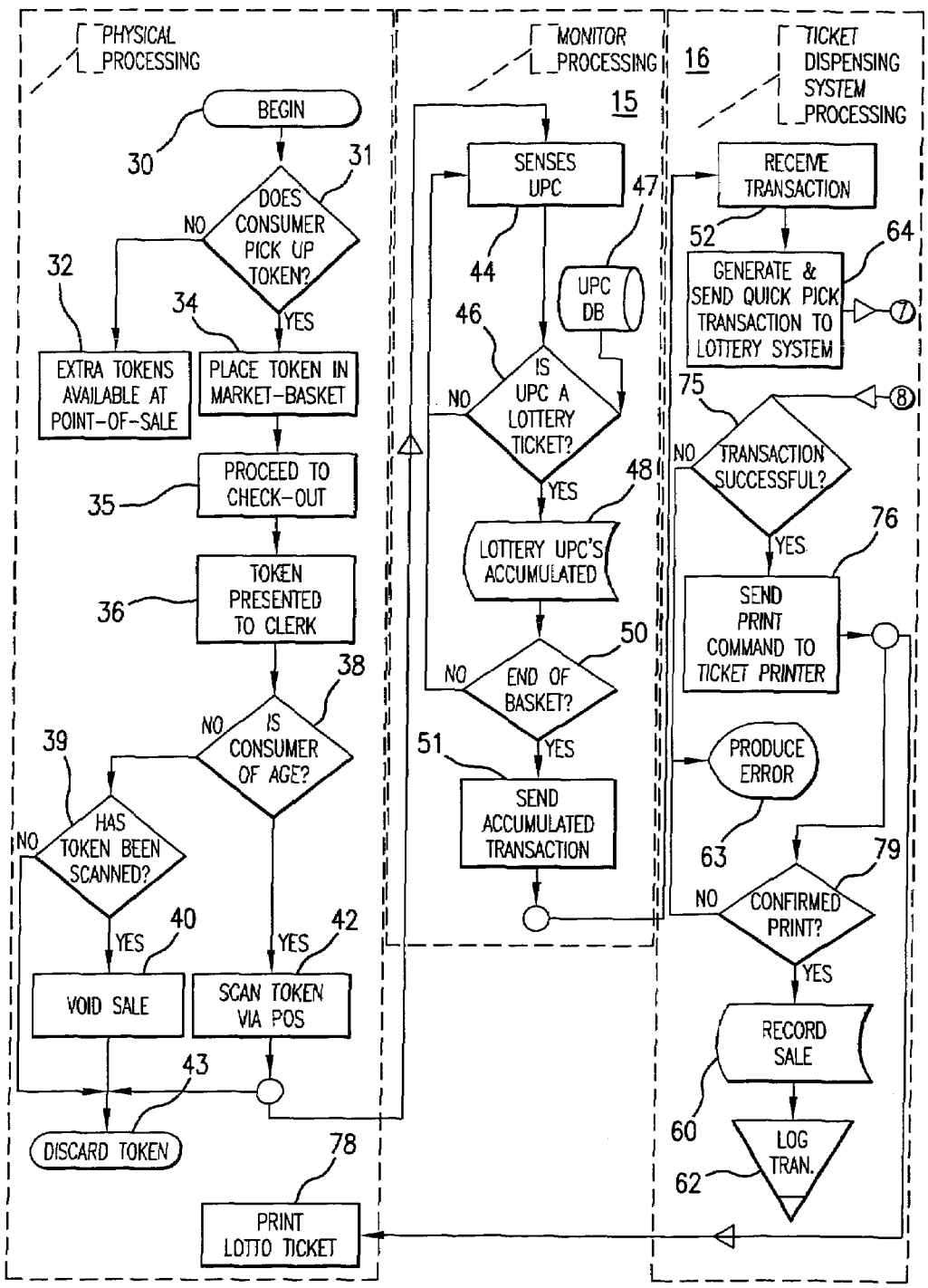
FIG. 8 is a flowchart of a method of selling and printing on-line lottery game tickets, only, of the invention.

FIG. 7 illustrates the control process described above, but for a method of selling pre-printed lottery game tickets within a store, only. As such, all of the steps illustrated in FIG. 7 are those described above for the process illustrated in FIGS. 3-6B, with the exception of step 53 in FIG. 7, which initiates a loop for each pre-printed lottery game ticket to be sold, following steps 55 through 62, as discussed hereinabove. FIG. 8 illustrates a method of selling on-line lottery game tickets, only, for example where the lottery retailer chooses not to offer pre-printed lottery game tickets in-store. The on-line ticket sales process FIG. 8 therefore follows the steps of the process of FIGS. 3-5 for selling on-line lottery game tickets in association with the applicable one of the subroutines illustrated in FIGS. 6A and 6B, respectively.

It is understood by those skilled in the art that those steps of the control process illustrated in FIGS. 3-8 implemented in the game monitor 15 and/or the ticket controller 16 represent blocks of executable computer or machine readable program code that will be executed by the appropriate computer, either the game monitor, the ticket dispensing systems, or the off-site lottery computer, as a part of the method and system of this invention. It is also known to those of skill in the art that the database illustrated in FIG. 9 can be programmed in any of the known types of programming codes and/or database programs, and can be stored in any suitable memory device provided as a part of the lottery system controller 12, i.e., the game monitor 15 and/or the ticket dispensing system 16 (FIG. 1).

Yet another embodiment of this invention is made possible by utilizing the system of FIG. 1, and the control process of FIGS. 3 through 6B for selling items of monetary value rather than lottery game tickets. Examples of items of monetary value that may be pre-printed and dispensed through a suitable item dispenser located at the POS terminal would thus include, but are not limited to, postage stamps, money orders, phone or calling cards, debit cards, credit cards, gift cards, or frequent shopper cards. Items of monetary value that can be printed by a suitable item printer located at each POS terminal would include, but are not limited to, money orders, gift certificates, and other negotiable instruments of a value to be determined by the consumer. The manner in which this is accomplished follows the process by which the above-described pre-printed and on-line lottery games may be played and sold.

Accordingly, a plurality of item tokens, pre-printed in the same fashion as the pre-printed lottery game tokens shown in FIGS. 2A and 2B, may be provided within a store. Each token will identify the type of item to be purchased, as well as a monetary value associated therewith. It is anticipated that there may also be tokens available for items to be purchased of a monetary value to be determined by the customer at the POS terminal and upon payment for the item to be purchased. The item purchaser will thus select the appropriate token or tokens as they shop and move throughout the store. No separate selection desk is needed at which the purchaser will fill out a request for a specific item. Rather, the purchaser need only take a pre-printed token having a pre-printed item identification code thereon to the POS terminal. Upon arriving at the POS terminal, the purchaser will present the item tokens to a sales clerk, where the tokens will be scanned with the bar code reader provided as a part of the POS terminal. The system used for this sales operation will be the same system as the lottery game system 5 illustrated in FIG. 1.

The game monitor will passively listen to the POS network traffic through the POS system controller, sensing all of the product identification codes scanned through the system. When a product identification code for an item of monetary value is scanned at the POS terminal that matches an item code therefore, and which item code is stored within a lookup table or database within the POS system controller, the POS system controller will return the sales price of the items being purchased back to the POS terminal through the POS network. The game monitor detects the scanned item identification code or codes as they pass from the POS terminal to the POS system controller, and then detects the sales price thereof as the POS system controller passes this information back to the POS terminal.

For items of a predetermined monetary value which may be in supply in an item dispenser located at the POS terminal, the game monitor will identify from the scanned item identification code the type of item to be purchased. The game monitor and/or a dispenser controller will then poll the item dispenser to determine if the item to be dispensed is present in the desired value, and if so, will authorize that item to be dispensed in the desired number at the POS terminal. The sales transaction/data will then be recorded within the game monitor.

Where, for example, an item is to be purchased at the POS terminal which does not have a predetermined monetary value, the appropriate token can be given, or a verbal request made to the sales clerk, it being anticipated that the sales clerk can initiate a manual sales request through the POS terminal for the item of monetary value to be sold, the POS terminal being programmed to accomplish this task. Thereafter the desired item's identification code will be scanned by the POS terminal through its bar code reader and entered into the POS network. The game monitor detects the scanned item identification code or codes as they pass from the POS terminal to the POS system controller, and then awaits the sales price thereof. The desired monetary amount of the item will be verbally transmitted by the purchaser to the sales clerk and entered into the system through the POS terminal, and subsequently detected by the game monitor. Thereafter, the game monitor communicates with an off-site authorization computer that will authorize and record the sale of the particular item associated with that authorization, for example a money order or a calling card, in the same fashion as the game monitor communicates with the off-site lottery computer. Once the transaction is authorized, a print command is issued to the item printer at the POS terminal. The item printer will be supplied with the appropriate paper/print stock for the item to be printed and a money order is printed at the POS terminal and dispensed to the purchaser.

Figure 10:
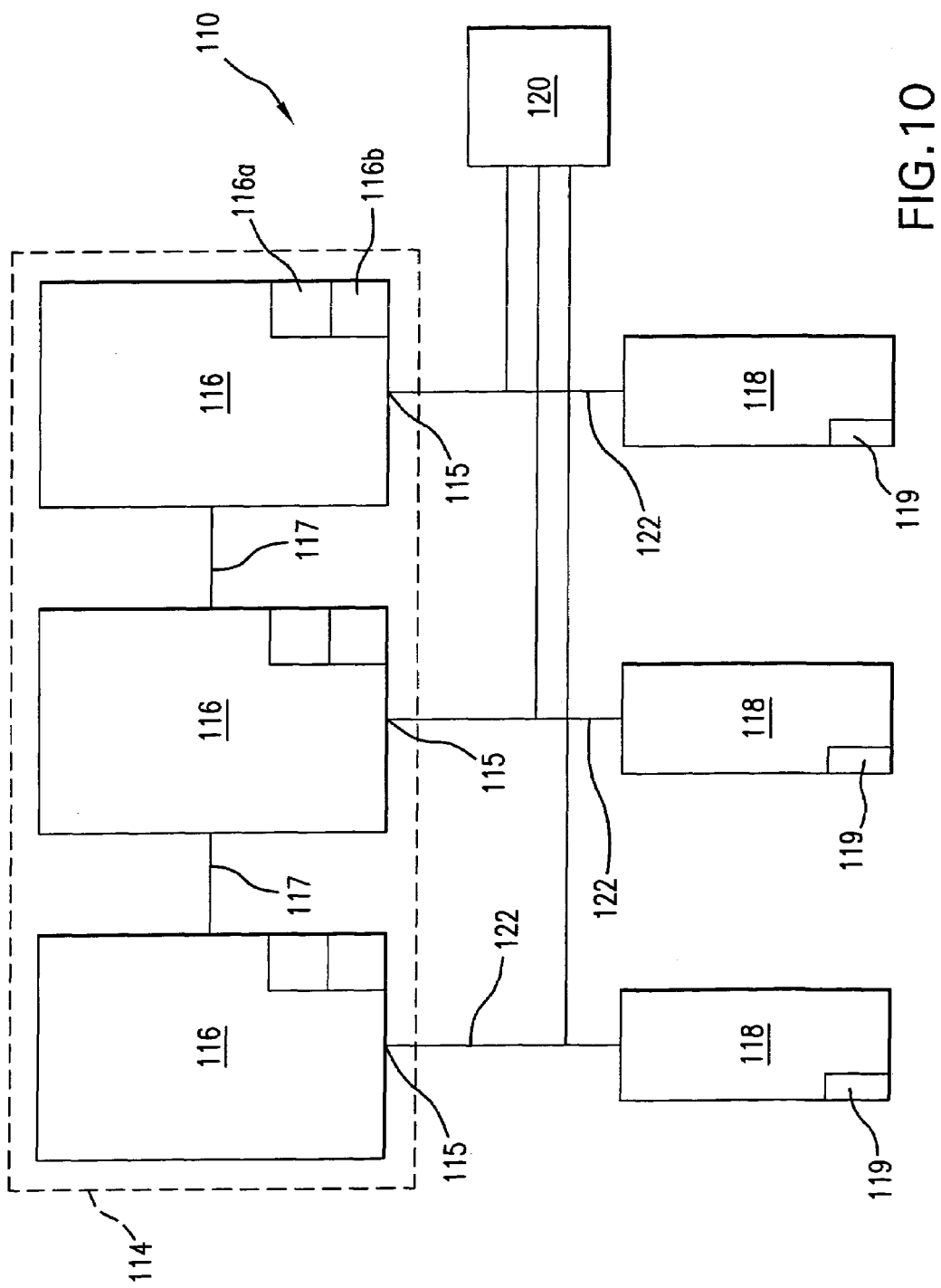
FIG. 10 is a schematic illustration of another embodiment of a ticket dispensing system embodying the features of the present invention having multiple point of sale terminals.
Figure 11:
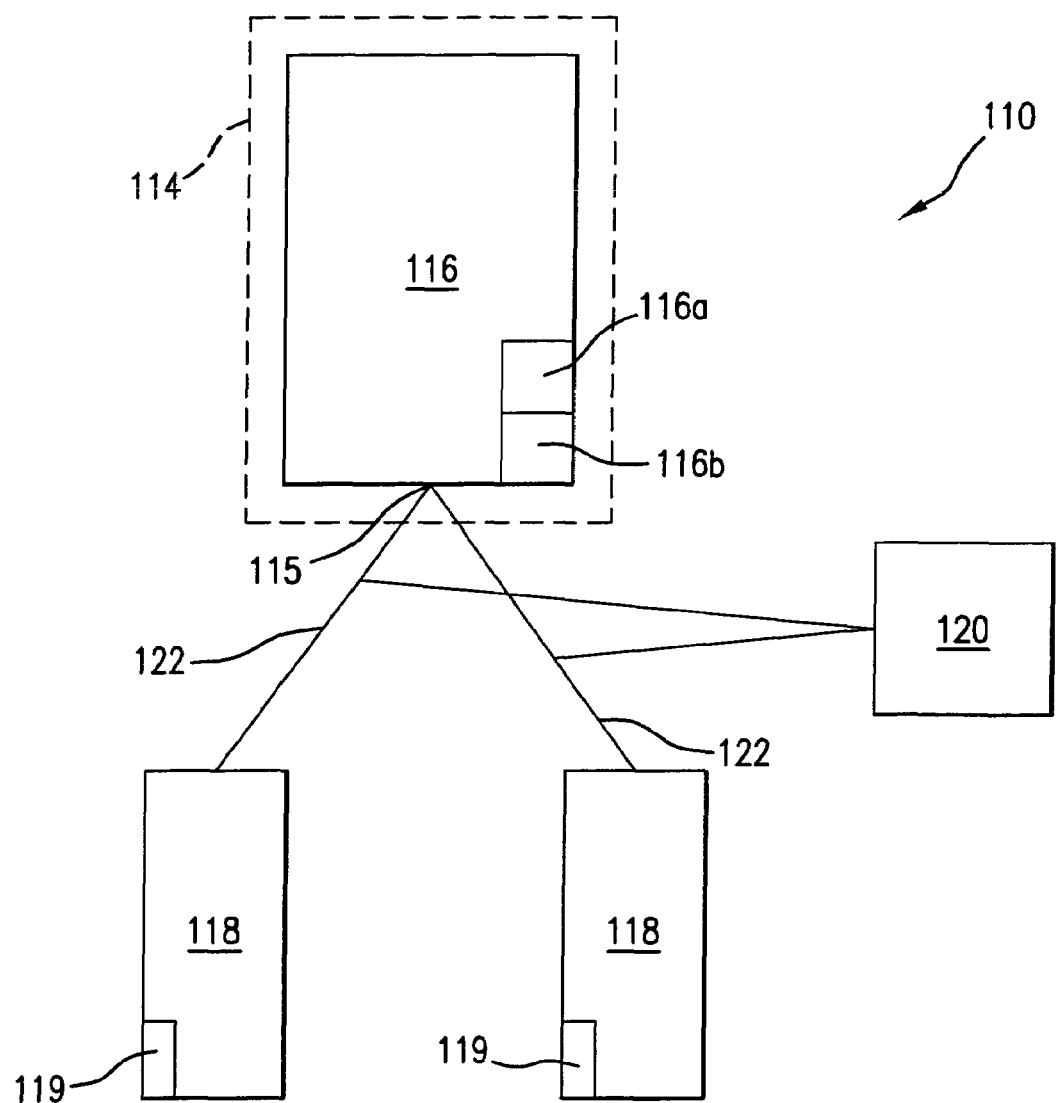
FIG. 11 is a schematic illustration of yet another embodiment of a ticket dispensing system embodying the features of the present invention having a single point-of-sale terminal.
Figure 12:
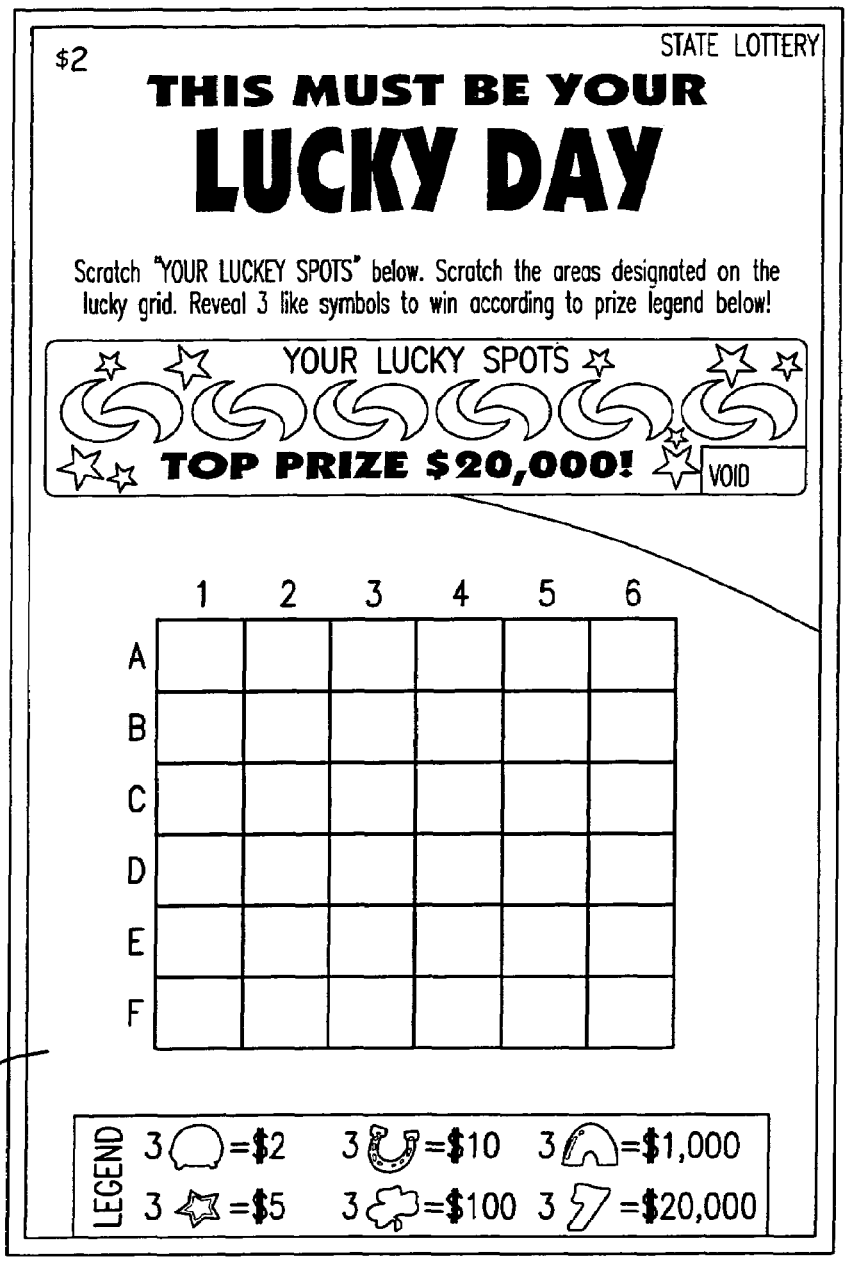
FIG. 12 is a plan view of a pre-printed lottery game ticket.

Referring now to FIGS. 10 and 11, an additional embodiment of a system for selling and dispensing game tickets 100 of the present invention is illustrated. The system 100 is once again adapted for selling and dispensing lottery tickets such as the scratch off play ticket 112 illustrated in FIG. 12. However, it is anticipated that the present invention may also be used for selling and distributing other ticket items as well, such as on-line lottery game tickets or other ticketed items, for example sports bets or wagers. Accordingly, the system 100 includes a retail point-of-sale ("POS") system 114 located within in a retail store environment. The POS system will include at least one POS terminal 116, or a series of POS terminals 116 networked to one another and to a central inventory computer 20 through a conventional POS network 117. The POS system 114 may be designed for any retail store or similar merchant, such as a small store, i.e, a convenience store, having only a single POS terminal 16 (FIG. 11), or a large "multi-lane" store having a plurality of checkout lanes each having a separate POS terminal 16 (FIG. 10). The POS terminals 16 are of known construction and operation, and may comprise those cash registers and/or POS terminals manufactured or distributed by IBM, NCR, Fujitsu, and/or Datachecker, respectively, as well as any of the other several types of POS terminals that now exist or may which be developed in the future.

The system 100 additionally includes at least one ticket dispenser assembly 118 connected to at least one of the POS terminals 116, with the ticket dispenser assembly 118 monitoring the output signal of that POS terminal. Moreover, and as shown in FIG. 10, there may be a series of POS terminals 116 each having a separate ticket dispenser assembly 118 positioned thereat and in communication with a respective one of the POS terminals, as shown. The ticket dispenser assembly 118 is adapted to monitor the POS terminal 116 with which it is in communication, the ticket dispenser assembly 118 being constructed to electronically detect and capture the signal emitted from the POS terminal when a POS operator (sales clerk) presses an assigned or programmed register or terminal key for that lottery or wagering game signaling that a lottery or game ticket 112 is in the process of being sold by the retailer. Correspondingly, the ticket dispenser assembly 118 will distribute the desired number of game tickets 112 based on the signal transmitted by the POS terminal 116, as discussed herein.

Each of the POS terminals 116 conventionally includes a price look up ("PLU") key 116a and a separate Cash Tender key 116b that are used in the ordinary course of business. The PLU key 116a is typically used to generate a signal to obtain price information for various items in inventory from the central inventory computer 200 or other memory storage device provided as a part of the POS system, or cash register, and the Cash Tender key 116b is also conventionally used to complete a sale to a game ticket purchaser. Consequently, each of the POS terminals 116 is connected to the central inventory computer 200 such that the respective POS terminals 116 transmit and receive conventional inventory information to and from, respectively, the central inventory computer.

The ticket dispenser assembly 118 of the system 100 is connected, i.e, hard wired to or is in wireless communication with the POS terminal 116 such that the ticket dispenser assembly intercepts the signal transmitted in the ordinary course of business to the central inventory computer in response to a terminal key press by the POS terminal operator. In a first embodiment, an interface cable 122, for example a "Y" cable, is used to connect the ticket dispenser 118 with the POS terminal 116. The interface cable 122 is connected to an output port 115, for example a serial port, of the POS terminal and interface cable splits the original signal transmitted from the POS terminal to the central inventory computer without interrupting the preexisting communication link between the POS terminal and the computer. The interface cable 122 may be interfaced with the serial port 115 of the POS terminal 116 using standard interfaces, such as RS-232, TTL, or RS-485, and it is foreseen that the POS terminal 116 will be able to interface with the ticket dispenser assembly 118 using additional protocols as well, such as High-level Data Link Control ("HDLC"), Ethernet, and Internet.

Each ticket dispenser assembly 118 may include a reversible motor drive (not illustrated) to separate and dispense the tickets 112, as disclosed in U.S. Pat. Nos. 5,950,898, 6,609,644, and 6,669,071. The dispensing operation thus involves running the motor forward a measured amount depending on the length of the tickets 112, then backwards to separate the ticket 112 from the remaining tickets within the game or ticket pack as a panel is moved to bend the ticket upwardly along a pre-formed line of separation. The ticket dispenser assemblies 118 may additionally include a display 119, such as a number of front panel LEDs (not illustrated), with the display providing a means to attract customers or indicate a dispenser or system fault. If a ticket dispenser assembly 118 is empty, jammed, or otherwise malfunctions, the LEDs will flash in a manner to draw attention to the machine.

A clerk interface device may also be supplied with the system. The clerk interface device can comprise a keyboard, a display and/or a bar code reader. The display would be used to alert the clerk to certain operational conditions such as a preprinted ticket dispenser assembly being low or our of tickets or the on-line ticket printer being jammed or out of ticket stock. The keyboard would be used to receive inputs from the clerk such as a sing-on password to activate the system. The bar code reader would be used to determine the game number of a preprinted pack of tickets being loaded into the ticket dispenser assembly.

In another embodiment of the invention, for certain ones of the POS terminals 116 the interface cable 122 may be able to engage a printer port of the POS terminal to provide the desired connection with the ticket dispenser assembly 118. Moreover, the interface cable 122 may connect with the display unit or display port of the POS terminal to make a connection point between the ticket dispenser and the POS terminal.

In operation, the system 100 is activated when one of the preprogrammed PLU keys 116a on the POS terminal 116 is depressed. Once depressed, a specific signal is transmitted from the serial port 115 of the POS terminal to the central inventory computer 120 or other memory storage device provided with the system. In the case of lottery tickets 112, this signal provides the central inventory computer with distinguishing information for the specific type of lottery or game ticket 112 desired, thus indicating the desired number of tickets to be purchased and requesting the price of the ticket or tickets sold. This transmitted information is also captured by the ticket dispenser assembly 118, such that the correct one of the tickets 112, and in the proper quantity, is dispensed by the system. In addition to the use of a central inventory computer 120, in some smaller convenience store applications, the POS terminal 116 may maintain price information of the respective lottery or game ticket(s) in a local memory storage device housed within or formed as a part of the POS terminal rather than accessing the central inventory computer.

The ticket 112 is not dispensed until the Cash Tender key 122 on the POS terminal is also depressed. During the pendency of the transaction, therefore, the dispense ticket information is held in a memory buffer of the ticket dispenser assembly until the Cash Tender key is depressed. Consequently, the cash tender signal emitted by the actuation of the Cash Tender key indicates that the transaction has been completed, and the ticket dispenser assembly may then dispense the desired ticket(s) in the desired quantity. Using the POS terminal to distribute the lottery or game tickets thereby prevents theft of tickets by only dispensing a ticket after a payment therefore has been made.

The ticket dispensing system also works in a passive mode only, as do the other embodiments of the system discussed herein. That is, the ticket dispenser assembly 118 is constantly monitoring all of the signals and purchasing traffic emitted from the POS terminal 116, with the ticket dispenser assembly 118 only responding when it receives a message from the POS terminal 116 to dispense the appropriate ticket.

It is also to be noted that cash registers, which may act as the described POS terminal(s), have a set number of available dedicated keys that may be programmed with particular product information. These dedicated keys may be used instead of the PLU key when only a few ticket dispenser assemblies 118 are included in the ticket dispensing system 100. For example, if the ticket dispensing system 100 has only four ticket dispenser assemblies 118, then the operator may program four separate and dedicated keys in the POS terminal 116 for those dispensers rather than using a PLU key therefore.

When there is a requirement for the POS terminal 116 (cash register) to communicate with a ticket dispenser assembly 118 that has the ability to dispense twenty instant tickets 112 by way of example, the number of keys available on the cash register may not be enough to transact the purchase. To solve this problem the ticket dispenser 118 also has the ability to recognize the PLU key 116a as discussed above. Accordingly, when multiple instant ticket games are to be dispensed, the PLU key 116a of the cash register is utilized. Generally, the PLU key 116a is used to record the sale and inform the cashier of the proper price for the selected item being sold in that store. The manager of the retail store typically programs the PLU key 116a according to the items to be sold. The manager will assign a PLU number and a corresponding price for numerous items within that store.

This embodiment of the invention thus beneficially allows the ticket dispenser assemblies 118 to be connected to pre-existing POS terminals 116, such that a retailer is not required to purchase new POS terminals to sell the desired lottery tickets. Once connected to the ticket dispenser assembly, the POS terminal will direct the distribution of the desired number of lottery tickets according to the operation of the PLU key and the subsequent operation of the Cash Tender key of the POS terminal.

In yet another embodiment of the invention, the PLU key 116a can represent the total amount of a purchase of lottery tickets the player wishes to purchase. After the Cash Tender key 116b is depressed, the player will be credited with a certain dollar value of tickets to be purchased. The player, using a player interface device 300 (for example a known type of a touch screen display), selects the desired lottery tickets to be purchased. The ticket dispenser assembly then distributes the chosen tickets to either the operator of the POS terminal or directly to the game player.

Figure 13:
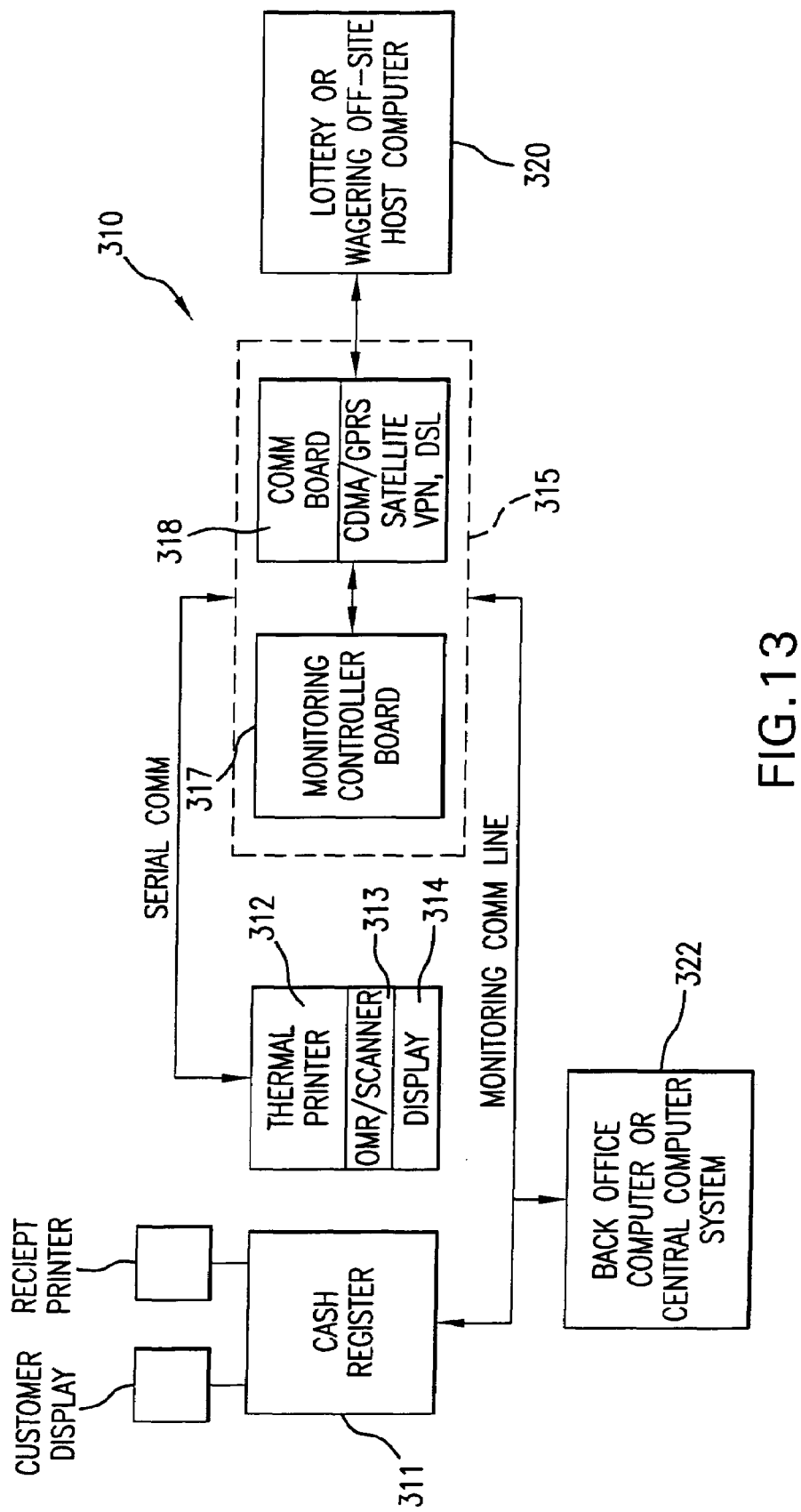
FIG. 13 is a schematic illustration of another embodiment of an on-line lottery or wagering system of the invention.

Still another embodiment of the invention is illustrated in FIG. 13, which system is adapted to permit the play of on-line lottery games as well as permitting on-line bets or wagers to be taken for lottery games, sporting events, and the like. The system 310 is constructed to monitor the output of the output port or ports of an otherwise conventional POS terminal or a cash register, either term being interchangeable here and both referred to hereafter as a "cash register," in order to capture the message that an on-line Lottery or Race Track Transaction ("OLRTT") has been initiated. This system works in a passive mode, but the system may also communicate bi-directionally with the cash register if requested by the system purchaser or user. By working in the passive mode, this system, as well as the other embodiments of the system disclosed herein, eliminates or otherwise minimizes the likely need for any software changes to the retailer cash register system. In this aspect, the system is substantially constantly listening to all messages and traffic from the cash register for an OLRTT signal, but only responds when it receives a message to print rather than dispense a lottery ticket or a wagering ticket, for example a race or sports event wagering ticket.

The system is able to interface and communicate with the serial port(s) of the cash register through the RS232, TTL, and RS485 communication protocols. It is also anticipated that other communications protocols such as HDLC, Ethernet, and Internet may also be incorporate into the system. Additionally, the system can monitor various cash register ports such as a printer port, a bar code scanner port, a customer display port, an agent display port, and the like, as well as the port or connection pathway from the cash register to the retailer's back office system(s), as desired.]

Referring now to FIG. 13, the system 310 comprises at least one POS terminal or cash register 311, a printer 312, which may comprise in one embodiment a thermal printer, and a OMR/scanner 313. The scanner may be integrated as a part of the printer, and the printer may also include an agent display 314, or the display may be provided separately. The system further comprises a game monitor 315 in communication with the at least one POS terminal. The game monitor 315 can comprise a conventional computer or central processing unit, which again may be provided as a part of the printer device, housing, or structure, and has a microprocessor or controller 317 as well as a communications board 318 or device provided as a part thereof, each component being conventional in its construction and operation. The system is constructed to communicate with an off-site computer 320, for example a centralized lottery operations or a racing tote operations computer by land line or by wireless link, as desired.

In one embodiment, the system may be operated in a basic "Quick Pick" mode in which the player's game numbers are selected by the system, in conventional fashion, or the player may choose to play their own desired game numbers or wager as selected by the game player. The customer game numbers or wagering indicia may either be keyed into the system through the cash register, or scanned into the system through the scanner/OMR 313 if marked on an otherwise conventional play, bet, or wager slip based on the game or sporting event being played. The system may be connected to one of the cash register's outlet ports through a "Y" cable which splits the signal without interrupting the original communications link between the cash register and the retailer's back office computer or system 322. It should be noted that with this type of a network connection, the system will monitor all traffic across the cable.

The system is activated when a pre-programmed lottery game or race track key on the cash register is depressed, or the requisite play or bet slip is scanned by the scanning device adapted to do so, which may be a separate scanner interfaced with the POS terminal or network, or which may be built into the POS terminal or other device at the retail station. For example, the play slip scanner may be built into and provided as a apart of the ticket dispenser and/or ticket printer positioned thereat. Once the key is depressed or play slip scanned, a specific game request signal or message is transmitted from the cash register's outlet port through the POS system within the store or convenience mart, and to which the system is connected. The information transmitted in this signal is captured by the game monitor of the system 310, the system then determining which type of transaction has been requested, for example a pre-printed/scratch off lottery game, an on-line lottery game, or a race track/sports event wagering transaction. At this point the transactional information necessary to request a game ticket or wager is transmitted to the off-site host computer 320 via one a number of conventional communication systems, as desired and known, which include by way of example and not of limitation the CDMA/GPRS, Satellite, VPN, and DSL communications networks, systems, and/or protocols.

Once the ticket/wager request has been transmitted to the off-site host computer, and while awaiting the transmission of the ticket/wager transaction authorization command and/or serial number to be transmitted back from the host computer, the pre-printing of the ticket or wager slip has been completed within the printer 312. Thereafter, and once the transmission of the transactional/authorization data and serial number has been received by the system 310, and once the cash register's cash tender key has been depressed by the sales clerk, the printing of the customer's ticket(s) or wager slip(s) will be completed. The printed ticket(s) or wager slip(s) are not dispensed from the printer, however, until the cash tender key on the cash register has been depressed. Accordingly, the final ticket or wager information is held in the system buffer until the cash tender key is depressed.

The cash tender signal or message from the cash register indicates to the system that the transaction has been completed and that the money therefore has been received by the sales clerk or agent from the customer. At that point the printer 312 will complete the transaction by printing the final part of the ticket or wager information, which typically comprises the serial number and barcode associated therewith, and pass the printed ticket or wager slip from the printer.

As known, cash registers typically have a number of keys available for the programming of product information therefore. Where a requirement for being able to offer a number of different games arises, multiple keys may be required on the cash register to accommodate the number of games offered through the system. To deal with this possible problem, the system has the ability to recognize a cash register price look up (PLU) key. When there are multiple games to be played, therefore, the PLU key of the cash register may used to record the sale(s) and to inform the sales clerk/cashier of the proper price for the selected items being sold. In usage, the store manager programs the PLU key or keys for the register(s) within the store. This is accomplished by the store manager assigning a PLU number and a corresponding price for that PLU numbered item within the store. For example, PLU keys may be programmed to have prices for:

PLU 1—Bread—$1.99;
PLU 2—Milk—$2.80;
PLU 3—Quick Pick Lottery Ticket—$1.00;
PLU 4—Quick Pick Power Ball Lottery Ticket—$1.00;
PLU 5—Race Track Wager—$2.00;
PLU 6—Player Selected Lottery Ticket—$1.00; and
PLU 7—Scratch-Off Lottery Ticket.

The other type of player selection data input device would be the use of the scanner/OMR reader 313 in place of a cash register keyboard entry. The Scanner/OMR would be utilized when there is a request to play a certain set of player selected numbers. The player or sales clerk would insert their play slip into the scanner which would initiate the desired transaction. The information would flow as described previously, except that now the information would flow from the scanner directly into the game monitor of the system rather than being intercepted as a POS signal from the output port(s) of the cash register. Once the system receives the information it is transmitted to the off-site host computer, either a lottery system computer or a race system tote computer, for processing. During this sales process the printer 312 preprints the ticket and waits for the final serial number and authorization data, for example a transaction barcode, from the system. The sales clerk or agent display 314 located within the printer housing will display the amount of the transaction and the sales clerk simply presses the proper key PLU key on the cash register and enters the amount of the transaction, which may also be accomplished through a conventional credit card processing system. The sales clerk presses the cash tend key, and the system prints the remaining portion of the ticket.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings.

What is claimed is:

1. A system for selling pre-printed lottery game tickets for purchase by a lottery game player, the system comprising:
 a central inventory computer and at least one point of sale terminal networked to said central inventory computer, said point of sale terminal having a plurality of terminal keys configured for entering transaction information for items purchased at the point of sale terminal;
 at least one dedicated ticket dispenser assembly for said point of sale terminal configured to monitor and intercept communications between said associated point of sale terminal and said central inventory computer; and
 a supply of pre-printed lottery game tickets held within the ticket dispenser assembly; and
 said ticket dispenser assembly configured to detect activation of a first predetermined terminal key of said associated point of sale terminal from monitored communications between said point of sale terminal and said central inventory computer and determine therefrom the number and type of pre-printed lottery games to be played and being further configured to dispense the desired number and type of game tickets therefrom upon the activation of a second predetermined terminal key of the associated point of sale terminal detected from monitored communications between said point of sale terminal and said central inventory computer.

2. The system of claim 1, wherein the number and type of pre-printed lottery game tickets so dispensed is communicated to the central inventory computer.

3. The system of claim 1, wherein the ticket dispenser assembly comprises a memory buffer, and wherein the ticket dispenser assembly stores the number and type of pre-printed lottery game tickets to be dispensed in the memory buffer until the activation of the second predetermined terminal key by the point of sale terminal operator.

4. The system of claim 3, wherein the ticket dispenser assembly comprises an automated pre-printed lottery game ticket dispenser assembly.

5. The system of claim 3, wherein the ticket dispenser assembly comprises a computer.

6. The system of claim 1, further comprising a network connecting the point of sale terminal to the central inventory computer, and the ticket dispenser assembly so as to monitor and detect communications between the point of sale terminal and the central inventory computer.

7. The system of claim 6, wherein the network comprises an Ethernet network.

8. The system of claim 6, wherein the network comprises a wireless network.

9. The system of claim 1, wherein the ticket dispenser assembly comprises an interface cable that is operatively coupled to a serial port of the point of sale terminal.

10. The system of claim 1, wherein the ticket dispenser assembly comprises an interface cable that is operatively coupled to a printer port of the point of sale terminal.

11. The system of claim 1, wherein the ticket dispenser assembly further comprises a user interface device selected from a group of interface devices consisting of at least one of a keyboard, a display and a bar code reader.

12. The system of claim 1, wherein the second predetermined terminal key comprises a cash tender key.

13. The system of claim 1, wherein each game ticket has an encrypted validation number on a surface of the game ticket that uniquely identifies each game ticket, and wherein the ticket dispenser assembly comprises a scanner adapted to read the encrypted validation number when the preprinted lottery game ticket is dispensed.

14. The system of claim 13, further comprising an off-site computer, wherein the scanner communicates the encrypted validation number to the off-site computer, the off-site computer recording the validation number and returning an authorization of the dispensed ticket.

* * * * *

UNITED STATES PATENT AND TRADEMARK OFFICE
CERTIFICATE OF CORRECTION

| | |
|---|---|
| PATENT NO. | : 7,621,810 B2 |
| APPLICATION NO. | : 11/093754 |
| DATED | : November 24, 2009 |
| INVENTOR(S) | : Gilmore et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 871 days.

Signed and Sealed this

Twenty-sixth Day of October, 2010

David J. Kappos
*Director of the United States Patent and Trademark Office*